US011908674B2

(12) United States Patent
Graf et al.

(10) Patent No.: US 11,908,674 B2
(45) Date of Patent: Feb. 20, 2024

(54) METHOD FOR GENERATING A LAYOUT OF ELECTRODES FOR AN ION GUIDE

(71) Applicant: TOFWERK AG, Thun (CH)

(72) Inventors: Stephan Graf, Heimberg (CH); Michael Kamrath, Thun (CH)

(73) Assignee: TOFWERK AG, Thun (CH)

( * ) Notice: Subject to any disclaimer, the term of this patent is extended or adjusted under 35 U.S.C. 154(b) by 477 days.

(21) Appl. No.: 17/332,323

(22) Filed: May 27, 2021

(65) Prior Publication Data

US 2022/0005683 A1 Jan. 6, 2022

(30) Foreign Application Priority Data

Jul. 1, 2020 (EP) .................................... 20183512

(51) Int. Cl.
*H01J 49/06* (2006.01)

(52) U.S. Cl.
CPC .................................. *H01J 49/062* (2013.01)

(58) Field of Classification Search
CPC ................................ H01J 49/062; H01J 49/00
(Continued)

(56) References Cited

U.S. PATENT DOCUMENTS 8,835,839 B1 9/2014 Anderson et al.
9,812,311 B2 11/2017 Anderson et al.
(Continued)

*Primary Examiner* — Kiet T Nguyen

(74) *Attorney, Agent, or Firm* — Birch, Stewart, Kolasch & Birch, LLP

(57) ABSTRACT

The invention relates to a method for generating a layout of electrodes for an ion guide for transporting ions along an ion path, the ion guide comprising electrodes arranged in the layout of electrodes along the ion path for transporting the ions along the ion path. For generating the layout of electrodes, a layout path corresponding to said the path is assumed and the layout of electrodes is generated along the layout path. The layout of electrodes and the layout path are in reference to a global reference system, wherein the layout of electrodes includes at least two layout subunits which are arranged in succession along the layout path, wherein each one of the at least two layout subunits is of one of at least one layout subunit type. The method includes defining the at least one layout subunit type, wherein each one of the at least one layout subunit type includes type information, the type information being adopted by each layout subunit of the respective one of the at least one layout subunit type. The type information includes a subunit electrode layout of at least one subunit electrode, the subunit electrode layout being in reference to a subunit reference system, wherein in the subunit electrode layout, each one of the at least one subunit electrode has a local position in the subunit reference system and is assigned to a class of electrodes, wherein the respective class of electrodes is associated with a type of voltage pattern to be applied to the electrodes belonging to the respective the class of electrodes. Furthermore, the type information includes a layout subunit position identifier for identifying a position of the subunit electrode layout in the global reference system. The method includes building up at least one segment of the layout of electrodes by assigning to each one of the at least two layout subunits one of the at least one layout subunit type and positioning each one of the at least two layout subunits at a respective position along the layout path.

18 Claims, 6 Drawing Sheets

(58) Field of Classification Search
USPC .......................................................... 250/290
See application file for complete search history.

(56) References Cited

U.S. PATENT DOCUMENTS

| | | | | |
|---|---|---|---|---|
| 2008/0067342 | A1 | 3/2008 | Ding | |
| 2019/0369050 | A1 | 12/2019 | Garimella et al. | |
| 2021/0364467 | A1* | 11/2021 | DeBord ............... | G01N 27/622 |

* cited by examiner

METHOD FOR GENERATING A LAYOUT OF ELECTRODES FOR AN ION GUIDE

TECHNICAL FIELD

The invention relates to a method for generating a layout of electrodes for an ion guide for transporting ions along an ion path, the ion guide comprising electrodes arranged in the layout of electrodes along the ion path for transporting said ions along said ion path.

BACKGROUND ART

Ion guides for transporting ions along an ion path are known. Some of these ion guides comprise electrodes arranged in a layout of electrodes along the ion path. Examples of such ion guides with electrodes arranged in a layout of electrodes along the ion path are described in U.S. Pat. No. 9,812,311 of Battelle Memorial Institute. These exemplary ion guides include two surfaces arranged parallel to each other, wherein the ion path takes course between the two surfaces. Both surfaces carry a large number of electrodes, wherein on both surfaces, the electrodes are arranged in a layout of electrodes. With some of these electrodes, a pseudopotential is formed that inhibits ions from approaching either one of the two surfaces. Simultaneously, DC potentials are applied on other electrodes for controlling and restricting movement of the ions along the ion path between the surfaces.

Due to the large number of electrodes employed in such ion guides, generating the layout of electrodes used in such ion guides is very complex and laborious. Thus, flaws like incorrectly arranged electrodes are easily incorporated in such layouts of electrodes, resulting in improper functionality of any ion guide comprising electrodes arranged in such a layout of electrodes.

SUMMARY OF THE INVENTION

It is the object of the invention to create a method for generating a layout of electrodes for an ion guide for transporting ions along an ion path, the ion guide comprising electrodes arranged in the layout of electrodes along the ion path, that enables a simple and easy way for obtaining a flawless layout of electrodes, enabling a proper functionality of the ion guide.

The solution of the invention is specified by the features of claim 1. According to the invention, for generating the layout of electrodes, a layout path corresponding to the ion path is assumed and the layout of electrodes is generated along the layout path, wherein the layout of electrodes and the layout path are in reference to a global reference system. Thereby, the layout of electrodes includes at least two layout subunits which are arranged in succession along the layout path, wherein each one of the at least two layout subunits is of one of at least one layout subunit type.

The method for generating the layout of electrodes includes defining the at least one layout subunit type, wherein each one of the at least one layout subunit type includes type information, the type information being adopted by each layout subunit of the respective one of the at least one layout subunit type.

The type information includes a subunit electrode layout of at least one subunit electrode, the subunit electrode layout being in reference to a subunit reference system. In the subunit electrode layout, each one of the at least one subunit electrode has a local position in the subunit reference system and is assigned to a class of electrodes, wherein the respective class of electrodes is associated with a type of voltage pattern to be applied to the electrodes belonging to the respective class of electrodes. Examples for this voltage pattern are a DC voltage, a periodic voltage pattern having a frequency, a pattern of randomly timed voltage pulses, a pattern of different DC voltages successively applied to the respective subunit electrode. Thereby, in case of a periodic voltage pattern having a frequency, the periodic voltage pattern may be a superposition of two or more periodic voltage pattern having different frequencies. Another example for the voltage pattern is a superposition of a DC voltage and a periodic voltage pattern having a frequency.

The type information further includes a layout subunit position identifier for identifying a position of the subunit electrode layout in the global reference system.

The method for generating the layout of electrodes includes building up at least one segment of the layout of electrodes by assigning to each one of the at least two layout subunits one of the at least one layout subunit type and positioning each one of the at least two layout subunits at a respective position along the layout path.

As mentioned above, according to the invention, a layout path corresponding to the ion path is assumed. Thereby, the layout path is a virtual path with respect to the layout of electrodes, while the ion path is the path along which the ions are transported in the ion guide. Thereby, it is irrelevant whether the ion path is known or predefined and the layout path is assumed to correspond to the entire ion path or to correspond to a segment of the ion path or whether the layout path is assumed first and the ion path is then given by the assumed layout path. Furthermore, the ion path and the layout path may be straight paths or may include bends or kinks. In an example, an ion path start position and an ion path end position of the ion path are known or predefined and the layout path is assumed to have a layout path start position corresponding to the ion path start position and to have a layout path end position corresponding to the ion path end position. In this example, the course of the layout path is assumed and with the assumed layout path, the course of the ion path is given. Furthermore, as an option to this example, a maximum volume within which the ion path is to be arranged and the maximum volumes position with respect to the ion path start position and the ion path end position may be known or predefined and the course of the layout path may be assumed to remain within or fill up a corresponding volume, wherein course of the ion path is then given by the course of the layout path such that ultimately, the ion path remains within or fills up the maximum volume.

Independent of these examples, the ion path and the layout path may comprise one or more junction. These junctions may even be switchable. Thus, in case of a junction connecting three branches of the ion path, the ion guide may be switchable by switching the junction from an operation state where ions entering the junction from the first branch of the ion path are transported away along the second branch of the ion path to an operation state where ions entering the junction from the first branch of the ion path are transported away along the third branch of the ion path.

According to the invention, the layout of electrodes includes at least two layout subunits which are arranged in succession along the layout path. Thereby, two of the at least two layout subunits which are neighbours in the succession can be arranged adjacent to each other without any further electrode arranged between the respective two layout subunits or the respective two layout subunits can be arranged with a gap in between, wherein at least one further electrode is arranged in the respective gap.

According to the invention, the at least two layout subunits are of at least one layout subunit type. Thus, in case the layout of electrodes includes exactly two layout subunits, these two layout subunits can be of the same layout subunit type or can each be of another layout subunit type. Similarly, in case the layout of electrodes includes more than two layout subunits, some or all layout subunits can be of the same layout subunit type. In case not all layout subunits are of the same layout subunit type, there can be two or more groups of at least one layout subunit wherein for each one of the two or more groups, the respective at least one layout subunit belonging to the respective group are of the same layout subunit type, wherein the layout subunits of different groups differ from each other in that they are of different layout subunit types.

According to the invention, the type information includes a subunit electrode layout of at least one subunit electrode, the subunit electrode layout being in reference to a subunit reference system. Thus, for each one of the at least two layout subunits, the respective subunit electrode layout is in reference to the subunit reference system of the respective layout subunit, wherein the subunit reference system is defined by the respective layout subunit type of the respective layout subunit because the type information is adopted by each layout subunit of the respective one of the at least one layout subunit type. In a preferred variant, in the subunit electrode layout, each one of the at least one subunit electrode has not only a local position in reference to the subunit reference system but also a shape in reference to the subunit reference system. Thereby, in a first variation, the shape is a two dimensional shape while in a second variation, the shape is a three dimensional shape. In another preferred variant, in the subunit electrode layout, each one of the at least one subunit electrode has a local position and a size in reference to the subunit reference system. In yet another variant, in the subunit electrode layout, each one of the at least one subunit electrode has a local position, a shape and a size in reference to the subunit reference system, wherein the shape is a two dimensional shape or a three dimensional shape.

According to the invention, each one of the at least one subunit electrode is assigned to a class of electrodes, wherein the respective class of electrodes is associated with a type of voltage pattern to be applied to the electrodes belonging to the respective class of electrodes. Thus, a particular layout subunit type may comprise a type information with a subunit electrode layout of more than one subunit electrode, wherein some or all of the more than one subunit electrodes are assigned to different classes of electrodes or are assigned to one and the same class of electrodes. Thereby, the classes of electrodes are advantageously defined globally in the sense where two different layout subunit types may comprise type information with subunit electrode layouts of one or more subunit electrodes being all assigned to the same class of electrodes, while the subunit electrode layouts of the respective two different layout subunit types differ in other features from each other.

Preferably, in case there is more than one class of electrodes, the different classes of electrodes differ from each other in that each class of electrodes is associated with a different type of voltage pattern to be applied to the electrodes belonging to the respective class of electrodes.

According to the invention, the type information includes a layout subunit position identifier for identifying a position of the subunit electrode layout in the global reference system. Thus, the layout subunit position identifier enables identifying a position of the subunit electrode layout in the global reference system. If the orientation of the subunit electrode layout with respect to the global reference system is known, the layout subunit position identifier furthermore enables identifying a global position in the global reference system of a local position as soon as a position of the respective layout subunit in the global reference system is known. Thereby, the orientation of the subunit electrode layout may be known because all layout subunits of the respective layout subunit type are oriented the same known way in the global reference system or because the type information includes a layout subunit orientation identifier for identifying the orientation of the subunit electrode layout in the global reference system, the layout subunit orientation identifier enabling orienting each layout subunit of the respective one of the at least one layout subunit type relative to the layout path at a position of the respective layout subunit along the layout path.

According to the invention, the method for generating the layout of electrodes includes building up at least one segment of the layout of electrodes by assigning to each one of the at least two layout subunits one of the at least one layout subunit type and positioning each one of the at least two layout subunits at a respective position along the layout path. Thus, the desired layout of electrodes is generated by building up the at least one segment of the layout of electrodes in the above explained way. Thereby, it is irrelevant whether to each one of the at least two layout subunits one of the at least one layout subunit types is assigned first and each one of the at least two layout subunits is positioned at a respective position along the layout path second or whether sequentially for each one of the at least two layout subunits, one of the at least one layout subunit types is assigned to the respective one of the at least two layout subunits and the respective one of the at least two layout subunits is positioned at the respective position along the layout path. Even more, it is possible to position one or more of the at least two layout subunits at their respective positions between assigning one of the at least one layout subunit type to one or more of the at least two layout subunits. For example, two or more of the at least two layout subunits can be combined to a group by orienting and positioning these two or more of the at least two layout subunits relatively to each other. These two or more of the at least two layout subunits can then be moved as a group and, if correctly oriented, positioned as a group in the global reference system to form a segment of the layout of electrodes. Such a group can also be used to define another layout subunit type. Like the group, such another layout subunit type is built up from the two or more layout subunits of one or more layout subunit types. Such another layout subunit type can be defined dynamically and on the fly during building up the at least one segment of the layout of electrodes by assigning to each one of the at least two layout subunits one of the at least one layout subunit type and positioning each one of the at least two layout subunits at a respective position along the layout path. In this case however, at least two layout subunit types are defined in total. Thus, in case at least two layout subunit types are defined in total, it is irrelevant whether all of the at least two layout subunit type are defined before building up the at least one segment of the layout of electrodes or whether at least one of the at least two layout subunit types is defined first and the at least one segment of the layout of electrodes is built up second, wherein during building up the at least one segment of the layout of electrodes, at least one further of the at least two layout types is defined.

Independent of the total number of layout subunit types defined in total, one, some or all of the at least one layout subunit type can be redefined during the building up of the at least one segment of the layout of electrodes. Thereby, when the respective layout subunit type is redefined, layout subunits of the respective layout subunit type which are already positioned in the layout of electrodes advantageously take over this redefinition. Furthermore, it is possible change one or more particular subunit electrodes which has already been placed in the layout of electrodes when the layout subunit with the respective subunit electrode has been placed in the layout of electrodes. Thereby, it is not required to redefine the respective layout subunit type. In this case, in the layout of electrodes, the respective subunit electrode is simply treated as an individual electrode. Thus, for example, it is possible to change the size or shape of the particular individual subunit electrode in the layout of electrodes. Similarly, it is possible to exchange the class of electrodes to which the particular individual subunit electrode is assigned in the layout of electrodes. Even more, it is possible to remove the particular individual subunit electrode from the layout of electrodes.

Independent of the total number of layout subunit types defined in total, one, some or all of the at least one layout subunit types can for example be defined by using a placeholder, constructing from this placeholder a layout subunit and using this layout subunit for defining of a corresponding layout subunit type. Thereby, the placeholder can for example initially cover the area of the subunit electrode layout of the type information of the respective future layout subunit type. Then, the placeholder can be shaped to obtain the desired shape of the subunit electrode of the respective subunit electrode layout or even divided and shaped into two or more subunit electrodes of the respective subunit electrode layout. Then, the one or more subunit electrodes of the respective subunit electrode layout can be assigned to the desired classes of electrodes. In this example, the placeholder can be positioned at a position along the layout path where later a layout subunit of the respective layout subunit type is to be placed. However, this positioning of the placeholder at the desired position along the layout path is not required. It is also possible to ultimately move the layout subunit of the respective layout subunit type to the desired position.

The invention allows for positioning two or more layout subunits at their respective position along the layout path in that the at least one subunit electrodes of the electrode layout subunits of the different layout subunits are separated from each other, while when considering for each one of the different layout subunits an enveloping area of the electrode layout subunit of the respective layout subunit, the enveloping areas of the different layout subunits overlap at least partially. This can be illustrated on the example of a chessboard. In this example, a first layout subunit includes an electrode layout subunit which has arranged on each white field of the chessboard one of its subunit electrodes, while a second layout subunit includes an electrode layout subunit which has arranged on each black field of the chessboard one of its subunit electrodes. Thus, the subunit electrodes of the first and the second layout subunits are separated from each other and do not overlap. At the same time, the enveloping areas of the two subunit electrode layouts overlap since they cover essentially the entire chessboard. In this example, the two layout subunits can be of different layout subunit types or can be of the same layout subunit type. In the latter case, one of the two layout subunits is simply rotated by 90° as compared to the other one of the two layout subunits.

Independent of these variants and variations, in the case where only one layout subunit type is defined, this layout subunit type can immediately be assigned to all of the at least two layout subunits.

By defining and using the two or more layout subunits and arranging them at their respective positions in succession along the layout path the at least one segment of the layout of electrodes can be generated in a simple and efficient way. Since the layout subunits are small as compared to the entire layout of electrodes and since the layout subunits of a same layout subunit type are defined by defining the respective layout subunit type, it is considerably simpler to verify whether the layout subunits are defined flawless and correctly as compared to a method where the entire layout of electrodes is generated from individual electrodes and where the entire layout of electrodes is to be verified for its flawlessness. Consequently, obtaining the desired layout of electrodes by either assembling the entire layout of electrodes from the layout subunits or at least assembling at least a segment of the layout of electrodes from layout subunits and subsequently or in between adding one or more additional individual electrodes to the layout of electrodes provides a simple and easy way for obtaining a flawless layout of electrodes, enabling a proper functionality of an ion guide comprising electrodes arranged in the layout of electrodes along the ion path. This advantage is particularly pronounced in the case where the entire layout of electrodes is built up by arranging the two or more layout subunits in succession along the layout path.

Advantageously, the layout of electrodes includes at least five, preferably at least ten, particular preferably at least fifty layout subunits which are arranged in succession along the layout path. This has the advantage that layouts of electrodes including a large number of electrodes can be flawlessly generated in a simple and efficient way.

Alternatively, the layout of electrodes includes two, three or four layout subunits which are arranged in succession along the layout path.

Preferably, the type information of at least one of the at least one layout subunit type includes a layout subunit orientation identifier for identifying an orientation of the subunit electrode layout in the global reference system and for orienting each layout subunit of the respective one of the at least one layout subunit type relative to the layout path at a position where the respective of the layout subunit is to be positioned or is positioned along the layout path. Thus, the layout subunit orientation identifier enables to identify an orientation of the respective subunit reference system with respect to the global reference system.

In this case, the layout subunits of the layout subunit type with the type information including the layout subunit orientation identifier are preferably oriented and positioned at a position along the layout path. Thus, in this case, the method for generating the layout of electrodes preferably includes building up at least one segment of the layout of electrodes by assigning to each one of the at least two layout subunits one of the at least one layout subunit type, orienting each one of the at least two layout subunits of the layout subunit type with the type information including the layout subunit orientation identifier, and positioning each one of the at least two layout subunits at a position along the layout path.

In this case, the type information advantageously identifies a course of a layout path segment, wherein when building up the at least one segment of the layout of electrodes by assigning to each one of the at least two layout subunits one of the at least one layout subunit type and positioning each one of the at least two layout subunits at the respective position along the layout path, each one of the at least two layout subunits is preferably oriented such that the layout path follows the course of the layout path segment of the respective one of the at least two layout subunits. Thereby, there are different ways the type information can identify the course of the layout path segment. In case the type information does include the layout subunit orientation identifier, the course of the layout path segment can be identified by knowing the course of the layout path segment relative to the layout subunit orientation identifier. In a special case thereof, the course of the layout path segment is at the same time the layout subunit orientation identifier. In this special case, the type information includes the course of the layout path segment in reference to the subunit reference system. In case the type information does not include the layout subunit orientation identifier, the course of the layout path segment can be known purely by knowledge of the course of the layout path segment in reference to the subunit reference system. Thus, independent of whether the type information includes the layout subunit orientation identifier or not, the type information can include the course of the layout path segment in reference to the subunit reference system.

As an alternative to these variants with the layout subunit orientation identifier, the type information of none of the at least one layout subunit type includes a layout subunit orientation identifier for identifying an orientation of the subunit electrode layout in the global reference system and for orienting each layout subunit of the respective one of the at least one layout subunit type relative to the layout path at a position where the respective of the layout subunit is to be positioned or is positioned along the layout path.

Advantageously, the type information of at least one of the at least one layout subunit type indicates a course of a layout path segment in reference to the subunit reference system, wherein for each one of the at least two layout subunits of the respective layout subunit type, when the respective one of the at least two layout subunits is positioned at the respective position along the layout path, the course of the layout path segment forms a segment of the layout path. This has the advantage that arranging the at least two layout subunits correctly at their respective positions along the layout path is simplified.

In an alternative, the type information goes without identifying a course of a layout path segment.

Advantageously, the ion path has an ion path start position, an ion path end position, an ion path course and an ion path transport direction. Thereby, the ions are advantageously transported in the ion guide along the ion path in the ion path transport direction. Consequently, the layout path preferably has a layout path start position corresponding to the ion path start position, a layout path end position corresponding to the ion path end position, a layout path course corresponding to the ion path course and a layout path transport direction corresponding to the ion path transport direction. Thereby, it is irrelevant whether the layout path is assumed first when generating the layout of electrodes for the ion guide or whether the ion path is determined first and the layout path is assumed based on the ion path afterwards. In either case, the layout path is assumed according to the ion path.

In a variant, the ion path goes without ion path transport direction and thus has the ion path start position, the ion path end position and the ion path course. In this variant, the ions may be transported in both directions along the ion path. In this variant, the layout path goes without layout path transport direction and thus has the layout path start position corresponding to the ion path start position, the layout path end position corresponding to the ion path end position, the layout path course corresponding to the ion path course.

Preferably, at least one of the at least one subunit electrode of the subunit electrode layout of the type information of at least one of the at least one layout subunit type is assigned to a class of electrodes being associated with a type of voltage pattern being a DC voltage. This has the advantage that DC-electrodes can easily be incorporated into the layout of electrodes.

Alternatively, none of the at least one subunit electrode of the subunit electrode layout of the type information of any of the at least one layout subunit type is assigned to a class of electrodes being associated with a type of voltage pattern being a DC voltage.

Preferably, at least one of the at least one subunit electrode of the subunit electrode layout of the type information of at least one of the at least one layout subunit type is assigned to a class of electrodes being associated with a type of voltage pattern being a periodic voltage pattern having a frequency, in particular a radio frequency. This has the advantage that AC-electrodes can easily be incorporated into the layout of electrodes. Thereby, the periodic voltage pattern can have a sinusoidal, rectangular, triangular or any other periodic shape. Independent of the shape of the periodic voltage pattern, each point in time during a period of the periodic voltage pattern can be assigned to a particular phase of the periodic voltage pattern. Thereby, the phase of the periodic voltage pattern at the given point in time can for example be described as an angle in the range from 0° to 360°. In this description, during the run of one period of the periodic voltage pattern, the phase increases linearly with time by 360°. Thereby, the phase starts at the start of the period at an initial value which is not necessarily 0° but can be any value from 0° up to 360°. In case this initial value is 0°, the phase reaches 360° at the end of the period and is set to the value 0° again as the end of the period is at the same time the start of the succeeding period. In case this initial value is larger than 0°, the phase restarts at 0° at the time it reaches 360°. Thus, independent of the initial value at the start of the period, the phase has again the initial value at the end of the period. In the present text, this here described description of the phase being an angle in the range from 0° to 360° is used. This is however not limiting, since any other unit and range can be used to describe the phase in the above described manner.

Preferably, the frequency of the periodic voltage pattern is a frequency of 1 kHz or more, 10 kHz or more, 100 kHz or more, 250 kHz or more, or 500 kHz or more. In first particular preferred variant, the frequency is in a range from 1 kHz to 50 MHz from 1 kHz to 5 MHz, from 1 kHz to 500 kHz, from 1 kHz to 100 kHz, from 1 kHz to 80 kHz, or from 10 kHz to 80 kHz. In a second particular preferred variant, the frequency is a radio frequency is in a range from 100 kHz to 50 MHz, from 250 kHz to 50 MHz, or from 500 kHz to 50 MHz. In a third particular preferred variant, the radio frequency is in a range from 100 kHz to 5 MHz, from 250 kHz to 5 MHz, or from 500 kHz to 5 MHz. Alternatively however, the frequency is lower than 1 kHz or higher than 50 MHz.

Alternatively, none of the at least one subunit electrode of the subunit electrode layout of the type information of any of the at least one layout subunit type is assigned to a class of electrodes being associated with a voltage pattern being a periodic voltage pattern having a frequency.

In case at least one of the at least one subunit electrode of the subunit electrode layout of the type information of the at least one of the at least one layout subunit type is assigned to the class of electrodes being associated with a type of voltage pattern being a periodic voltage pattern having a frequency, in particular a radio frequency, the class of electrodes being associated with this type of voltage pattern being a periodic voltage pattern having a frequency, in particular a radio frequency, preferably includes a phase identifier referring to a reference phase of the respective periodic voltage pattern. Thereby, in case two or more subunit electrodes in the respective subunit electrode layout are assigned to different classes of electrodes being associated with a type of voltage pattern being a periodic voltage pattern having a frequency, preferably at least one of these classes of electrodes includes such a phase identifier referring to a reference phase of the respective periodic voltage pattern. In a preferred variant however, all such classes of electrodes include such a phase identifier referring to a reference phase of the respective periodic voltage pattern having a phase. Thereby, the reference phases of the different classes of electrodes can be the same or can differ from each other.

The phase identifier can be the reference phase referred to by the respective phase identifier or can be any identifier enabling referring to the respective reference phase. In either case, the reference phase can be a specific phase at a given point in time. In the second case of the phase identifier being any identifier enabling referring to the respective reference phase, it is however not required that the reference phase is a specific phase at a given point in time. In this case, it is sufficient if the particular phase identifier enables identifying a phase difference of the reference phase referred to by the respective phase identifier as compared to the reference phase referred to by another particular phase identifier. This is sufficient to enable a tuning of the phase difference between the phases of the periodic voltage pattern to be applied to different electrodes in an arrangement of electrodes arranged in the layout of electrodes by tuning the phase differences between reference phases referred to by the phase identifiers of classes of electrodes being associated with different types of voltage pattern being periodic voltage pattern having a same frequency. Thereby, it is irrelevant whether the electrodes in the layout of electrodes are subunit electrodes or are individual electrodes. In the case of subunit electrodes, it is furthermore not required that the respective subunit electrodes are of the subunit electrode layout of the type information of the same layout subunit type. Consequently, one or more class of electrodes including a phase identifier referring to a reference phase of the respective periodic voltage pattern has the advantage that relating the reference phases of subunit electrodes of the same subunit electrode type, of different subunit electrode types and even relating the reference phases of subunit electrodes with the reference phases of individual electrodes of the layout of electrodes which are assigned to classes of electrodes being associated with different types of voltage pattern being periodic voltage pattern having the same frequency, wherein these individual electrodes of the layout of electrodes are not subunit electrodes of any layout subunit of one of the at least one layout subunit type but are individually placed in the layout of electrodes, is enabled in a simple and efficient way.

As illustration for the tuning of the phase difference between the phases of the periodic voltage pattern to be applied to different electrodes in an arrangement of electrodes arranged in the layout of electrodes, an example with two classes of electrodes being associated with a type of voltage pattern being a periodic voltage pattern having a same frequency is assumed. Thereby, each one of the two classes of electrodes includes a different phase identifier referring to a different reference phase. In this example, the first phase identifier is the number “1”, while the second phase identifier is the number “2”. Thereby, it can for example be defined that any phase identifier being the number “1” refers to a reference phase of 0° and that any phase identifier being the number “2” refers to a reference phase of 180°. It is however as well possible to define the phase identifiers relatively to each other. In this case, it can be defined that any phase identifier being the number “2” refers to a reference phase of 180° more than the reference phase being referred to by any phase identifier being the number “1” and/or that any phase identifier being the number “1” refers to a reference phase of 180° less than the reference phase being referred to by any phase identifier being the number “2”. Thereby, the definition of the reference phase to which a phase identifier being a particular number refers, can be defined at a very late stage in generating the layout of electrodes. Similarly, the definition of the difference between two reference phases to which two phase identifiers being particular numbers refer to can be defined at a very late stage in generating the layout of electrodes. Even more, these definitions can easily be adjusted once all electrode subunits and possible individual electrodes are positioned in the layout of electrodes. For example in case the layout path comprises three branches which meet in a junction, the differences between the reference phases along the branches can be defined when generating the branches, while the reference phases of the electrodes positioned adjacent to each other at the junction can be adjusted to meet the requirements of the functioning of the junction at the end of the generating process. Then, the previously determined differences between the reference phases along the branches automatically adjusts all reference phases in the layout of electrodes for ensuring a proper working of the future ion guide.

Preferably, in the layout of electrodes, at least two or at least three subunit electrodes are assigned to different classes of electrodes being associated with a type of voltage pattern being a periodic voltage pattern having a same frequency, in particular a same radio frequency, wherein each of the different classes of electrodes associated with a type of voltage pattern being a periodic voltage pattern having the same frequency, in particular the same radio frequency, includes a different a phase identifier referring to a different reference phase of the respective of said periodic voltage pattern. This has the advantage that a more complex layout of electrodes can be generated. This advantage is obtained independent of whether the at least two or at least three subunit electrodes are part of the subunit electrode layout of the type information of the same layout subunit type or whether the at least two or the at least three subunit electrodes are part of the subunit electrode layouts of the type information of different layout subunit types. Thereby, the periodic voltage pattern can have a sinusoidal, rectangular, triangular or any other periodic shape.

Preferably, the same frequency of the periodic voltage pattern is a frequency of 1 kHz or more, 10 kHz or more, 100 kHz or more, 250 kHz or more, particular preferably 500 kHz or more. In a first preferred variant, the same radio frequency is in a range from 100 kHz to 50 MHz, from 250 kHz to 50 MHz, or from 500 kHz to 50 MHz. In a second preferred variant, the same radio frequency is in a range from 100 kHz to 5 MHz, from 250 kHz to 5 MHz, or from 500 kHz to 5 MHz. In a third preferred variant, the same frequency is in a range from 1 kHz to 50 MHz, from 1 kHz to 5 MHz, from 1 kHz to 500 kHz, from 1 kHz to 100 kHz, from 1 kHz to 80 kHz, or from 10 kHz to 80 khz. In yet another variant however, the same frequency is lower than 1 kHz or higher than 50 MHz.

Alternatively, in the layout of electrodes, no at least two or at least three subunit electrodes are assigned to different classes of electrodes being associated with a type of voltage pattern being a periodic voltage pattern having a same frequency, in particular a same radio frequency, wherein each of the different classes of electrodes associated with a type of voltage pattern being a periodic voltage pattern having the same frequency, in particular the same radio frequency, includes a different a phase identifier referring to a different reference phase of the respective of said periodic voltage pattern.

Preferably, in the layout of electrodes, two of the at least two or of the at least three subunit electrodes assigned to different classes of electrodes being associated with a type of voltage pattern being a periodic voltage pattern having the same frequency, in particular the same radio frequency, are assigned to different classes of electrodes, wherein the respective two classes of electrodes include phase identifiers referring to reference phases differing by about 180°, particular preferably by 180°, from each other. Independent of whether these two subunit electrodes are part of the subunit electrode layout of the type information of the same layout subunit type or whether these two subunit electrodes are part of the subunit electrode layouts of the type information of different layout subunit types, the reference phases referred to by the phase identifiers differing by about 180° has the advantage that the respective two subunit electrodes generate a pseudopotential repelling ions and thus preventing the ions from approaching a region around the respective two subunit electrodes too closely in case the respective two subunit electrodes are arranged close to each other in the layout of electrodes. In case of an ion guide comprising the layout of electrodes with the respective two subunit electrodes and the respective two subunit electrodes being arranged on a same surface, the ions are prevented from approaching the respective surface in the region around the respective two subunit electrodes. This advantage is particularly articulated in case the phase difference between the respective two reference phases is 180°.

Alternatively, in the layout of electrodes, no two of the at least two or of the at least three subunit electrodes assigned to different classes of electrodes being associated with a type of voltage pattern being a periodic voltage pattern having the same frequency, in particular the same radio frequency, are assigned to different classes of electrodes, wherein the respective two classes of electrodes include phase identifiers referring to reference phases differing by about 180°, particular preferably by 180°, from each other.

Preferably, in the layout of electrodes, at least three of the at least three subunit electrodes assigned to different classes of electrodes being associated with a type of voltage pattern being a periodic voltage pattern having a same frequency, in particular a same radio frequency, are traveling-wave-electrodes and assigned to different classes of electrodes, wherein the respective classes of electrodes include phase identifiers referring to different reference phases and are subsumable into a same superclass of traveling-wave-electrodes. This has the advantage that an electrode layout with traveling electrodes can be flawlessly generated in a simple and efficient way.

In case there are at the same time two of the at least two or of the at least three subunit electrodes assigned to different classes of electrodes being associated with a type of voltage pattern being a periodic voltage pattern having the same frequency, in particular the same radio frequency, are assigned to different classes of electrodes, wherein the respective two classes of electrodes include phase identifiers referring to reference phases differing by about 180°, particular preferably by 180°, from each other, none, one or two of the subunit electrodes which are traveling-wave-electrodes and assigned to one of the classes of electrodes subsumable into the superclass of traveling-wave electrodes may at the same time be one of the mentioned two of the of the at least three subunit electrodes assigned to different classes of electrodes being associated with a type of voltage pattern being a periodic voltage pattern having the same frequency, in particular the same radio frequency, are assigned to different classes of electrodes, wherein the respective two classes of electrodes include phase identifiers referring to reference phases differing by about 180°, particular preferably by 180°, from each other. In this case, all these subunit electrodes are assigned to a class of electrodes associated with a type of voltage pattern being a periodic voltage pattern having the same frequency, in particular the same radio frequency.

Instead however, there can be two of at least two or of at least three subunit electrodes assigned to different classes of electrodes being associated with a type of voltage pattern being a periodic voltage pattern having the first same frequency, in particular the first same radio frequency, are assigned to different classes of electrodes, wherein the respective two classes of electrodes include phase identifiers referring to reference phases differing by about 180°, particular preferably by 180°, from each other, while at the same time, there are at least three of at least three subunit electrodes assigned to different classes of electrodes being associated with a type of voltage pattern being a periodic voltage pattern having a second same frequency, in particular a second same radio frequency, are traveling-wave-electrodes and assigned to different classes of electrodes, wherein the respective classes of electrodes include phase identifiers referring to different reference phases and are subsumable into a same superclass of traveling-wave electrodes. In an example of this variant, the first same radio frequency is in a range from 500 kHz to 5 MHz, while the second same frequency is in a range from 1 kHz to 100 kHz. In another example of this variant, the first same radio frequency is in a range from 500 kHz to 5 MHz, while the second same frequency is in a range from 1 kHz to 80 kHz. In yet another example of this variant, the first same radio frequency is in a range from 500 kHz to 5 MHz, while the second same frequency is in a range from 10 kHz to 80 kHz.

There may be one or more superclass of traveling electrodes, wherein into each superclass of traveling-wave electrodes, at least three classes of electrodes are subsumable. Thereby, one class of electrodes may subsumable into more than one superclass of traveling-wave electrodes. This has the advantage that an electrode layout with traveling electrodes can be flawlessly generated in a simple and efficient way.

Advantageously, the classes of electrodes being subsumable into a particular superclass of traveling-wave-electrodes are associated with types of voltage patterns being periodic voltage patterns having a same frequency, in particular a same radio frequency. Thus, the frequency is advantageously the same for all voltage patterns with which classes of electrodes subsumable into this particular superclass of traveling-wave-electrodes are associated. Thereby, the different classes of electrodes subsumable into the particular superclass of traveling-wave-electrodes advantageously include phase identifiers referring to different reference phases. Thus, the voltage patterns with which the classes of electrodes subsumable into the particular superclass of traveling-wave-electrodes are associated advantageously differ from each other at least in having different phases. Thereby, the differences between the different phases can be specified by the particular superclass, by the classes of electrodes subsumable into the particular superclass, or elsewhere. This can be illustrated with the help of the above mentioned example with two classes of electrodes being associated with a type of voltage pattern being a periodic voltage pattern having a same frequency, wherein each one of the two classes of electrodes includes a different phase identifier referring to a different reference phase, the first phase identifier being the number “1” and the second phase identifier being the number “2”. This example can be extended by a third class of electrodes being associated with a type of voltage pattern being a periodic voltage pattern having the same frequency, wherein the third class of electrodes includes another, third phase identifier referring to a another reference phase, wherein the third phase identifier is the number “3”. Furthermore, the example can be extended by the three classes of electrodes being subsumable into a same superclass of traveling-wave-electrodes. In this example, the superclass can specify that the reference phase referred to by the phase identifier being the number “3” is 120° smaller than the reference phase referred to by the phase identifier being the number “2”, and that the reference phase referred to by the phase identifier being the number “2” is 120° smaller than the reference phase referred to by the phase identifier being the number “1”. This relation between the reference phases referred to by the phase identifiers can however be specified somewhere else than in the superclass, too. In order to specify the differences between the different phases by the classes of electrodes subsumable into the particular superclass, the phase identifiers can be set differently. In an example, the first phase identifier is 240°, while the second phase identifier is 120° and the third phase identifier is 0°.

Independent of the precise relations between the reference phases, this has the advantage that an electrode layout for an ion guide like for example the ion guide of the ion guide assembly described in EP 3 561 853 A1 can be flawlessly generated in a simple and efficient way. When doing so, the at least three of the at least three subunit electrodes being traveling-wave-electrodes are to be considered as the at least three conveying electrodes described in EP 3 561 853 A1.

Preferably, seen along the layout path, at least one pair of next nearest neighbouring ones of the before mentioned traveling-wave-electrodes assigned to classes of electrodes subsumable into the same superclass of traveling-wave-electrodes are advantageously assigned to different classes of electrodes. Thereby, each pair of next nearest neighbouring ones of the before mentioned traveling-wave-electrodes assigned to classes of electrodes subsumable into the same superclass of traveling-wave-electrodes can be assigned to different classes of electrodes or only some pairs of the next nearest neighbouring ones of the before mentioned traveling-wave-electrodes assigned to classes of electrodes subsumable into the same superclass of traveling-wave-electrodes can be assigned to different classes of electrodes. The electrodes of each pair of next nearest neighbouring ones of the before mentioned traveling-wave-electrodes assigned to classes of electrodes subsumable into the same superclass of traveling-wave-electrodes can thereby be arranged adjacent to each other with or without a gap between or even with one or more different electrodes assigned to a different class of electrodes not being subsumable into the particular superclass of traveling-wave-electrodes.

Seen along the layout path, the before mentioned traveling-wave-electrodes assigned to classes of electrodes subsumable into the same superclass of traveling-wave-electrodes are advantageously arranged sequentially along at least a part the layout path in order to enable generating with an arrangement of electrodes for the ion guide for transporting ions along the ion path, the arrangement of electrodes comprising the electrodes arranged in the layout of electrodes, a traveling wave along at least a part of the ion path in that the periodic voltage pattern associated with the classes of electrodes subsumable into the respective superclass of traveling-wave-electrodes are applied to the respective electrodes in the arrangement of electrodes. Thereby, the traveling wave advantageously has a wavelength. Thus, seen along the layout path, the before mentioned traveling-wave-electrodes assigned to classes of electrodes subsumable into the same superclass of traveling-wave-electrodes are advantageously arranged sequentially along at least a part the layout path for enabling generating the traveling wave along the part of the layout path having the wavelength. Thereby, seen along the layout path, the before mentioned traveling-wave-electrodes assigned to classes of electrodes subsumable into the same superclass of traveling-wave-electrodes are advantageously arranged in at least one global wavelength unit extending over an area having a length measured along the layout path, wherein this length is the wavelength. Within one such global wavelength unit, seen along the layout path, starting at a first one of the traveling-wave-electrodes and following the layout path in one direction sequentially from one to the next one of these traveling-wave-electrodes, advantageously each next nearest neighbouring traveling-wave-electrode is assigned either to the same class of electrodes as the preceding traveling-wave-electrode or assigned to another class of electrodes than all preceding traveling-wave-electrodes until both all classes of electrodes subsumable into the same superclass of traveling-wave-electrodes and the global wavelength unit are run-through.

For being able to generate a traveling wave over a distance along the layout path being the wavelength multiplied by an integer number larger than 1, traveling-wave-electrodes assigned to classes of electrodes subsumable into the same superclass of traveling-wave-electrodes can be arranged in several such global wavelength units along the layout path. Thereby, the global wavelength units are preferably arranged consecutively adjacent to each other along the layout path.

Considering the traveling-wave-electrodes of one global wavelength unit, the two classes of electrodes of the respective nearest neighbouring traveling-wave-electrodes seen along the layout path are advantageously associated with periodic voltage patterns and advantageously include phase identifiers referring to different reference phases, wherein the reference phases advantageously differ by about 360° multiplied by a distance between geometrical centres of the respective next nearest neighbouring traveling-wave-electrodes divided by the wavelength and divided by a non-zero integer number. Particular advantageously, the reference phases differ by 360° multiplied by the distance between the geometrical centres of the respective next nearest neighbouring subunit electrodes divided by the wavelength and divided by a non-zero integer number. This has the advantage that a constant average conveyance speed of the ions along electrodes in the ion guide corresponding to the traveling-wave-electrodes is achieved. Most advantageously, the non-zero integer number is 1. Thus, the global wavelength unit covers precisely one wavelength. This simplifies enabling to generate a traveling wave over a distance along the layout path being the wavelength multiplied by an integer number larger than 1 by arranging traveling-wave-electrodes assigned to classes of electrodes subsumable into the same superclass of traveling-wave-electrodes in several global wavelength units along the layout path, in that the global wavelength units are arranged consecutively adjacent to each other along the layout path.

Alternatively, in the layout of electrodes, no at least three of the at least three subunit electrodes assigned to different classes of electrodes being associated with a type of voltage pattern being a periodic voltage pattern having a same frequency, in particular a same radio frequency, are traveling-wave-electrodes and assigned to different classes of electrodes, wherein the respective classes of electrodes include phase identifiers referring to different reference phases and are subsumable into a same superclass of traveling-wave-electrodes. In such an alternative, the layout electrodes goes without subunit electrodes being traveling-wave-electrodes and assigned to different classes of electrodes, wherein the respective classes of electrodes include phase identifiers referring to different reference phases and are subsumable into a same superclass of traveling-wave-electrodes.

Preferably, the subunit electrode layout of the type information of at least one of the at least one layout subunit type is a multiple electrode layout of at least two or at least three subunit electrodes. This has the advantage that a more complex layout of electrodes can be generated.

Advantageously, in the multiple electrode layout, at least one first subunit electrode of the at least two subunit electrodes or the at least three subunit electrodes, respectively, is assigned to a first class of electrodes and at least one second subunit electrode of the at least two subunit electrodes or the at least three subunit electrodes, respectively, is assigned to a second class of electrodes. This has the advantage that a more complex layout of electrodes for a more complex functionality of the ion guide can be generated.

Preferably, both the first class of electrodes and the second class of electrodes are associated with a type of voltage pattern being a periodic voltage pattern having a same frequency, in particular a same radio frequency, wherein each of the first class of electrodes and the second class of electrodes includes a different phase identifier referring to a different reference phase of the respective of the periodic voltage pattern, wherein the reference phases referred to by the different phase identifier of the first class of electrodes and the second class of electrodes, respectively, differ by about 180°, particular preferably by 180°, from each other.

The two periodic voltage pattern having a phase difference of about 180° has the advantage that they generate a pseudopotential repelling ions and thus preventing the ions from approaching a region around the respective two subunit electrodes too closely. In case in an ion guide comprising the layout of electrodes with the respective two subunit electrodes, the respective two subunit electrodes are arranged on a same surface, the ions are prevented from approaching the respective surface in the region around the respective two subunit electrodes. This advantage is particularly articulated in case the phase difference between the respective two periodic voltage pattern is 180°.

Alternatively, the voltage pattern to be applied to the electrodes belonging to the first class of electrodes and the voltage pattern to be applied to the electrodes belonging to the second class of electrodes are not periodic voltage pattern having a same frequency, in particular a radio frequency, wherein each of the first class of electrodes and the second class of electrodes includes a different phase identifier referring to a different reference phase of the respective of the periodic voltage pattern, wherein the reference phases referred to by the different phase identifier of the first class of electrodes and the second class of electrodes, respectively, differ by about 180°, particular preferably by 180°, from each other.

Independent of whether the voltage pattern to be applied to the electrodes belonging to the first class of electrodes and the voltage pattern to be applied to the electrodes belonging to the second class of electrodes are periodic voltage pattern having a same frequency, in particular a radio frequency, wherein each of the first class of electrodes and the second class of electrodes includes a different phase identifier referring to a different reference phase of the respective of the periodic voltage pattern, wherein the reference phases referred to by the different phase identifier of the first class of electrodes and the second class of electrodes, respectively, differ by about 180°, particular preferably by 180°, from each other or not, and even independent of whether in the multiple electrode layout, at least one first subunit electrode of the of at least two subunit electrodes is assigned to a first class of electrodes and at least one second subunit electrode of the at least two or at least three subunit electrodes is assigned to a second class of electrodes or not, the subunit electrode layout of the type information of at least one of the at least one layout subunit type is advantageously a multiple electrode layout of at least three subunit electrodes, wherein at least three of the at least three subunit electrodes are traveling-wave-electrodes and are assigned to different classes of electrodes, wherein the respective classes of electrodes include phase identifiers referring to different reference phases and are subsumable into a same superclass of traveling-wave-electrodes. Thereby, there may be one or more superclass of traveling electrodes, wherein into each superclass of traveling electrodes, at least three classes of electrodes are subsumable. Thereby, one class of electrodes may be subsumable into more than one superclass of traveling electrodes.

This has the advantage that an electrode layout with traveling electrodes can be flawlessly generated in a simple and efficient way.

The type information of the at least one of the at least one layout subunit type which includes the subunit electrode layout being a multiple electrode layout of at least three subunit electrodes preferably identifies the course of a layout path segment in reference to the respective subunit reference system, wherein for each one of the at least two layout subunits of the respective layout subunit type, when the respective one of the at least two layout subunits is positioned at the respective position along the layout path, the course of the layout path segment forms a segment of the layout path, wherein when building up the at least one segment of the layout of electrodes by assigning to each one of the at least two layout subunits one of the at least one layout subunit type and positioning each one of the at least two layout subunits at the respective position along the layout path, each one of the at least two layout subunits being of the layout subunit type with the type information with the course of the layout path segment being identified is preferably oriented such that the layout path follows the course of the layout path segment of the respective one of the at least two layout subunits at the position of the respective one of the at least two layout units along the layout path, wherein in the subunit electrode layout of the type information with the subunit electrode layout being the multiple electrode layout of at least three subunit electrodes and of the type information identifying the course of the layout path segment, the subunit electrodes of the different classes of electrodes subsumable into the respective superclass of traveling-wave-electrodes are preferably arranged along the layout path segment with one or more subunit electrode of one class of electrodes after one or more other subunit electrode of another class of electrodes such that the different classes of electrodes subsumable into the respective superclass follow one another along the respective layout path segment.

Thus, seen along the respective layout path segment, at least one pair of next nearest neighbouring ones of the before mentioned traveling-wave-electrodes of the respective subunit electrode layout of the respective layout subunit type which are assigned to classes of electrodes subsumable into the same superclass of traveling-wave-electrodes are advantageously assigned to different classes of electrodes. Thereby, each pair of next nearest neighbouring ones of the before mentioned traveling-wave-electrodes assigned to classes of electrodes subsumable into the same superclass of traveling-wave-electrodes can be assigned to different classes of electrodes or only some pairs of the next nearest neighbouring ones of the before mentioned traveling-wave-electrodes assigned to classes of electrodes subsumable into the same superclass of traveling-wave-electrodes can be assigned to different classes of electrodes. The electrodes of each pair of next nearest neighbouring ones of the before mentioned traveling-wave-electrodes assigned to classes of electrodes subsumable into the same superclass of traveling-wave-electrodes can thereby be arranged adjacent to each other with or without a gap between or even with one or more different electrodes assigned to a different class of electrodes not being subsumable into the particular superclass of traveling-wave-electrodes.

Seen along the respective layout path segment, the before mentioned traveling-wave-electrodes of the respective subunit electrode layout of the respective layout subunit type which are assigned to classes of electrodes subsumable into the same superclass of traveling-wave-electrodes are advantageously arranged sequentially along at least a part the respective layout path segment in order to enable generating with an arrangement of electrodes for the ion guide for transporting ions along the ion path, the arrangement of electrodes comprising the electrodes arranged in the layout of electrodes, a traveling wave along at least a part of the ion path in that the periodic voltage pattern associated with the classes of electrodes subsumable into the respective superclass of traveling-wave-electrodes are applied to the respective electrodes in the arrangement of electrodes. Thereby, the traveling wave advantageously has a wavelength. Thus, seen along the layout path segment, the before mentioned traveling-wave-electrodes of the respective subunit electrode layout of the respective layout subunit type which are assigned to classes of electrodes subsumable into the same superclass of traveling-wave-electrodes are advantageously arranged sequentially along at least a part the respective layout path segment for enabling generating the traveling wave along the part of the respective layout path segment having the wavelength. Thereby, seen along the respective layout path segment, the before mentioned traveling-wave-electrodes of the respective subunit electrode layout of the respective layout subunit type which are assigned to classes of electrodes subsumable into the same superclass of traveling-wave-electrodes are advantageously arranged in at least one subunit wavelength unit extending over an area having a length measured along the respective layout path segment, wherein this length is the wavelength. In one such subunit wavelength unit, seen along the respective layout path segment, starting at a first one of these traveling-wave-electrodes and following the respective layout path segment in one direction sequentially from one to the next one of these traveling-wave-electrodes, advantageously each next nearest neighbouring traveling-wave-electrode is assigned either to the same class of electrodes as the preceding traveling-wave-electrode or assigned to another class of electrodes than all preceding traveling-wave-electrodes until both all classes of electrodes subsumable into the same superclass of traveling-wave-electrodes and the subunit wavelength unit are run-through. Thereby, once a layout subunit of the respective layout subunit type is placed and thus incorporated in the layout of electrodes, the subunit wavelength unit forms one of the above described global wavelength subunits.

Considering the traveling-wave-electrodes of one subunit wavelength unit, the two classes of electrodes of the respective nearest neighbouring traveling-wave-electrodes seen along the respective layout path segment are advantageously associated with periodic voltage patterns and advantageously include phase identifiers referring to different reference phases, wherein the reference phases advantageously differ by about 360° multiplied by a distance between geometrical centres of the respective next nearest neighbouring traveling-wave-electrodes divided by the wavelength and divided by a non-zero integer number. Particular advantageously, the reference phases differ by 360° multiplied by the distance between the geometrical centres of the respective next nearest neighbouring subunit electrodes divided by the wavelength and divided by a non-zero integer number. This has the advantage that a constant average conveyance speed of the ions along electrodes in the ion guide corresponding to the traveling-wave-electrodes is achieved. Most advantageously, the non-zero integer number is 1. Thus, the subunit wavelength unit covers precisely one wavelength. Even more, a length of a layout subunit of the respective layout subunit type measured along the layout path segment of the respective layout subunit is advantageously a positive integer number multiplied by one wavelength.

Such subunit wavelength units have the advantage that an electrode layout for an ion guide like for example the ion guide of the ion guide assembly described in EP 3 561 853 A1 can be flawlessly generated in a very simple and efficient way. When doing so, the at least three of the at least three subunit electrodes being traveling-wave-electrodes are to be considered as the at least three conveying electrodes described in EP 3 561 853 A1.

Preferably, in the method for generating the layout of electrodes for an ion guide for transporting ions along the ion path, a global wiring layout for wiring the electrodes of the layout of electrodes is defined, the global wiring layout being in reference to the global reference system. This has the advantage that the layout of the electrodes and the global wiring layout for wiring the electrodes arranged in the layout of electrodes along the ion path can be generated in a simple and efficient way.

Advantageously, the global wiring layout for wiring the electrodes of the layout of electrodes describes a connection of at least some, preferably all, the electrodes of the layout of electrodes which are assigned to the same class of electrodes. This has the advantage that the electrodes which are assigned to the same class of electrodes are connected and can thus, when the electrodes are manufactured according the layout of electrodes, simply be connected to a voltage source for providing a voltage of the voltage pattern associated with the respective class of electrodes.

In a preferred variant, the global wiring layout for wiring the electrodes of the layout of electrodes provides at least one voltage source connection point describing the point where a voltage source for supplying a voltage of a voltage pattern associated with one of the class of electrodes can be connected to the global wiring layout when the layout of the electrodes is manufactured.

In an advantageous variant, the type information of at least one of the at least one layout subunit type includes a subunit wiring layout for wiring the at least one subunit electrode of the subunit electrode layout of the respective of the type information, the subunit wiring layout being in reference to the subunit reference system. This has the advantage that not only the layout of the electrodes but also the global wiring layout for wiring the electrodes arranged in the layout of electrodes along the ion path can be flawlessly generated in a simple and efficient way.

Preferably, the subunit electrode layout of the type information with the subunit wiring layout is a multiple electrode layout of at least two subunit electrodes assigned to a same class of electrodes, wherein the respective of the subunit wiring layout describes a connection of the respective of the at least two subunit electrodes assigned to the same class of electrodes. This has the advantage that wiring up the electrodes is simplified considerably.

Alternatively, no subunit wiring layout describes a connection of at least two subunit electrodes of the respective subunit electrode layout assigned to the same class of electrode.

Advantageously, the subunit wiring layout provides for each class of electrodes present in the subunit electrode layout of the type information with the respective of the subunit wiring layout a connection point at a local position in the respective of the subunit reference system, said connection point being for connecting the respective of the subunit wiring layout into the global wiring layout, wherein when building up the at least one segment of the layout of electrodes by assigning to each one of the at least two layout subunits one of the at least one layout subunit type and positioning each one of the at least two layout subunits at a respective position along the layout path, the respective of the subunit wiring layouts are connected into the global wiring layout by using the respective connection point when defining the global wiring layout. This has the advantage that the global wiring layout is easily and in a simple way generated by connecting and thus integrating the respective subunit wiring layouts into the global wiring layout.

In a variant however, the subunit wiring layouts are integrated into the global wiring layout differently. For example, the subunit wiring layouts of groups of two or more layout subunits are connected by connecting their respective subunit wiring layouts first and the resulting grouped wiring layout is connected and thus integrated into the global wiring layout second.

In another variant, the type information of none of the at least one layout subunit type includes a subunit wiring layout for wiring the at least one subunit electrode of the subunit electrode layout of the respective the type information, the subunit wiring layout being in reference to the subunit reference system.

Alternatively to these variants with the global wiring layout, the method for generating the layout of electrodes for an ion guide for transporting ions along the ion path goes without defining a global wiring layout for wiring the electrodes of the layout of electrodes.

Advantageously, the layout of electrodes is provided as digital data. This digital data preferably includes a position of each one of the electrodes of the layout of electrodes in reference to the global reference system. In a preferred variant, the digital data includes for each one of the electrodes of the layout of electrodes information about the class of electrodes the respective electrode is assigned to. In another variant however, the digital data goes without including for each one of the electrodes of the layout of electrodes information about the class of electrodes the respective electrode is assigned to. In case the global wiring layout is generated, too, the global wiring layout is as well provided as digital data. In this case, the digital data preferably includes a course of the connection lines connecting the respective electrodes of the layout of electrodes as described by the global wiring layout. Alternatively, however, the layout of electrodes and, if applicable, the global wiring layout, are provided in a different form.

Advantageously, from the layout of electrodes, a manufacturing instruction for manufacturing a printed circuit board carrying electrodes arranged in the layout of electrodes is generated. This step is effected in a particular fast and simple way in case the layout of electrodes is provided as digital data. Particular advantageously, from the layout of electrodes, a codified manufacturing instruction, in particular a script, readable by a machine for manufacturing the printed circuit board carrying electrodes arranged in the layout of electrodes is generated from the layout of electrodes. Formats of such scripts are known in the art of manufacturing printed circuit boards. The manufacturing instruction may however as well be in a different format.

In case the global wiring layout is generated, too, the manufacturing instruction for manufacturing the printed circuit board advantageously includes instructions for manufacturing a wiring of the electrodes arranged in the layout of electrodes according to the global wiring layout.

Alternatively, the method goes without the step of generating a manufacturing instruction for manufacturing a printed circuit board carrying electrodes arranged in the layout of electrodes from the layout of electrodes.

Advantageously, the above described method for generating a layout of electrodes for an ion guide for transporting ions along an ion path is used for manufacturing an arrangement of electrodes with the electrodes are arranged in the layout of electrodes. This is obtained with a method for manufacturing an arrangement of electrodes for an ion guide for transporting ions along an ion path comprising the electrodes arranged in a layout of electrodes along the ion path for transporting the ions along the ion path, wherein the layout of electrodes is generated with the above described method for generating the layout of electrodes for the ion guide for transporting ions along the ion path and wherein the arrangement of electrodes is manufactured based on the layout of electrodes.

Particular advantageously, the arrangement of electrodes is a printed circuit board carrying the electrodes arranged in the layout of electrodes.

Alternatively however, the arrangement of electrodes is not a printed circuit board carrying the electrodes arranged in the layout of electrodes. For example, the arrangement of electrodes is an arrangement including a support structure and the electrodes, wherein the electrodes are carried by the support structures. Thereby, the electrodes of the layout of electrodes can have flat, plane-like two dimensional shapes or can have complex three dimensional shapes like for example rings, squares, balls or horseshoes.

Advantageously, the above described method for generating a layout of electrodes for an ion guide for transporting ions along an ion path is used for generating an ion guide. This is obtained with a method for generating an ion guide for transporting ions along an ion path comprising electrodes arranged in a layout of electrodes along the ion path for transporting the ions along the ion path, wherein the layout of electrodes for the ion guide for transporting the ions along the ion path is generated with the above described method for generating the layout of electrodes for the ion guide for transporting ions along the ion paths.

In a preferred variant of the method for generating the ion guide, the ion path and the corresponding layout path are defined first and the layout of the electrodes is generated with the method for generating the layout of electrodes second.

In an advantageous variant, the ion guide includes two surfaces arranged parallel to each other, wherein the ion path takes course between the two surfaces. Thereby, both surfaces carry electrodes for transporting the ions along the ion guide. In this variant, advantageously the ion path and the layout path are defined first and a layout of electrodes describing the arrangement of the electrodes on the two surfaces is generated with the method for generating the layout of electrodes, second. In a first preferred variation, one layout of electrodes is generated which describes the arrangement of the electrodes on the two surfaces simultaneously. In a second preferred variation, the layout of electrodes describes the arrangement of the electrodes on one surfaces only. In this second preferred variation, either one layout of electrodes applies to both surfaces in the sense that on both surfaces, the electrodes are arranged according to this layout of electrodes, or two different layouts of electrodes are generated, wherein each one of the two different layouts of electrodes describes the arrangement of the electrodes on a respective one of the two surfaces.

Alternatively, the ion guide is generated differently. For example, the ion guide comprises only one surface of electrodes. In yet another example, the electrodes of the layout of electrodes are not arranged on a surface at all. Rather, the electrodes of the layout of electrodes are of complex three dimensional shapes like for example rings, squares or horseshoes such that the layout of electrodes is a layout in three dimensional space.

Advantageously, the above described method for generating an ion guide for transporting ions along an ion path comprising electrodes arranged in a layout of electrodes along the ion path for transporting the ions along the ion path is used for manufacturing an ion guide. This is obtained with a method for manufacturing an ion guide for transporting ions along an ion path by generating the ion guide with the method for generating an ion guide for transporting ions along an ion path comprising electrodes arranged in a layout of electrodes along the ion path for transporting the ions along the ion path and by subsequently manufacturing the ion guide.

Thereby, advantageously, when manufacturing the ion guide, an arrangement of electrodes for the ion guide is manufactured with the above described method for manufacturing an arrangement of electrodes for an ion guide for transporting ions along an ion path comprising the electrodes arranged in a layout of electrodes along the ion path for transporting the ions along the ion path, wherein the arrangement of electrodes is manufactured based on the layout of electrodes and is manufactured with the above described method for manufacturing an arrangement of electrodes for an ion guide for transporting ions along an ion path comprising the electrodes arranged in a layout of electrodes along said ion path for transporting the ions along the ion path.

In an advantageous variant, the above described methods are computer-implemented methods. Alternatively, however, the above described methods are not computer-implemented.

Advantageously, a data processing system comprises means for carrying out the above described method according to the invention for generating a layout of electrodes for an ion guide for transporting ions along an ion path. Furthermore, advantageously, a data processing system comprises means for carrying out the above described method for manufacturing an arrangement of electrodes for an ion guide for transporting ions along an ion path comprising the electrodes arranged in a layout of electrodes along an ion path for transporting the ions along the ion path. Furthermore, advantageously, a data processing system comprises means for carrying out the above described method for generating an ion guide for transporting ions along an ion path comprising electrodes in a layout of electrodes along the ion path for transporting the ions along the ion path. Furthermore, advantageously, a data processing system comprises means for carrying out the above described method for manufacturing an ion guide for transporting ions along an ion path.

The above described methods are advantageously employed in a computer program product. This is obtained with a computer program product comprising instructions which, when the program is executed by a computer, cause the computer to carry out the respective method. This has the advantage that a very efficient execution of the respective method can obtained. Be it in only generating the layout of electrodes, be it in generating the ion guide, be it in manufacturing an arrangement of electrodes according to the layout of electrodes or in manufacturing the ion guide.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
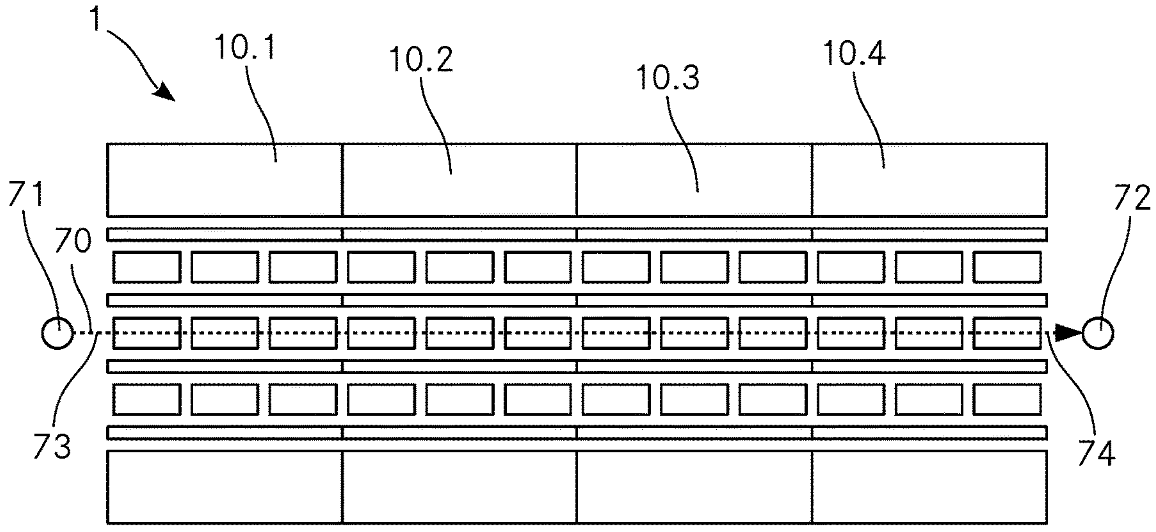
FIG. 1 a layout of electrodes for an ion guide for transporting ions along an ion path, the ion guide comprising electrodes arranged in the layout of electrodes along the ion path for transporting the ions along the ion path, the layout of electrodes being generated with the method according to the invention, FIG. 2*a, b* an illustration of a layout subunit type used in the method according to the invention, FIG. 3 the layout of electrodes of FIG. 1, wherein the electrodes of the layout of electrodes are shown in dashed lines and wherein additionally a global wiring layout for wiring the electrodes of the layout of electrodes is shown, FIG. 4 a simplified schematic view of an arrangement of electrodes with electrodes arranged in the layout of electrodes of FIG. 1 and wired with the global wiring layout of FIG. 3 on a printed circuit board, FIG. 5 a simplified schematic view of an ion guide comprising two printed circuit boards of FIG. 4, FIG. 6 another layout of electrodes generated with the method according to the invention, FIG. 7 an illustration of a second layout subunit type used in the method according to the invention, FIG. 8 an illustration of yet another layout of electrodes generated with the method according to the invention, FIG. 9 an illustration of a third layout subunit type used in the method according to the invention, FIG. 10*a, b, c* illustrations of a fourth, fifth and sixth layout subunit type used in the method according to the invention, FIG. 11*a, b* illustration of a fifth layout subunit type used in the method according to the invention, once as initially defined and once as modified during execution of the method.

FIG. 1 shows a layout of electrodes 1 for an ion guide for transporting ions along an ion path, the ion guide comprising electrodes arranged in the layout of electrodes 1 along the ion path for transporting the ions along the ion path. Thereby, the ion path has an ion path start position, an ion path end position, an ion path course and an ion path transport direction.

The layout of electrodes 1 shown in FIG. 1 has been generated with the method according to the invention. In the method according to the invention, a layout path 70 corresponding to the ion path is assumed. Thus, the layout path 70 has a layout path start position 71 corresponding to the ion path start position, a layout path end position 72 corresponding to the ion path end position, a layout path course 73 corresponding to the ion path course and a layout path transport direction 74 corresponding to the ion path transport direction.

The layout of electrodes 1 is generated along the layout path 70. Thereby, the layout of electrodes 1 and the layout path 70 are in reference to a global reference system, wherein the layout of electrodes 1 includes at least two layout subunits 10.1, 10.2, 10.3, 10.4 which are arranged in succession along the layout path 70, wherein each one of the at least two layout subunits 10.1, 10.2, 10.3, 10.4 is of one of at least one layout subunit type 20.

Figure 2A:
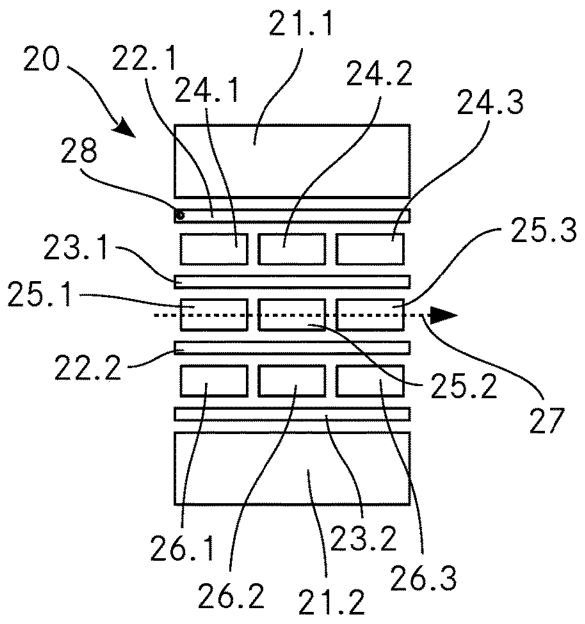
Figure 2B:
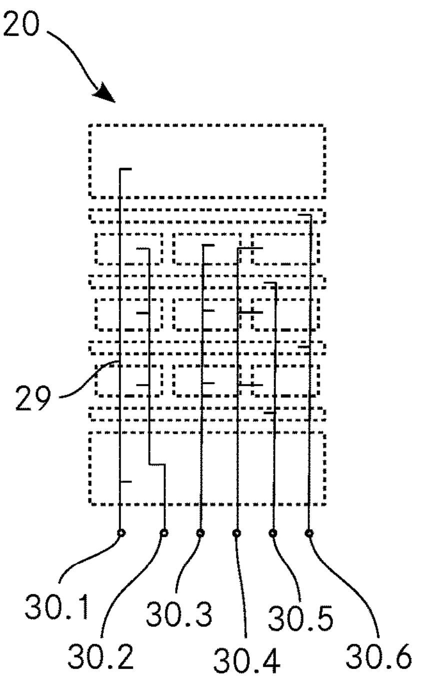

In the exemplary layout of electrodes 1 shown in FIG. 1, the layout of electrodes 1 includes in total four layout subunits 10.1, 10.2, 10.3, 10.4 which are all of the same layout subunit type 20 which is illustrated in FIGS. 2*a* and 2*b*.

In the following, the method is explained further on the example of the layout of electrodes 1 shown in FIG. 1 and the layout subunit type 20 illustrated in FIGS. 2*a* and 2*b*. Later on, further possible variants of the method are explained in the context of other layouts of electrodes 101 and layout subunit types 120.

The method for generating the layout of electrodes 1 includes defining at least one layout subunit type 20, wherein the layout subunit type 20 includes type information which is adopted by each layout subunit 10.1, 10.2, 10.3, 10.4 of the at least one layout subunit type 20.

The type information includes a subunit electrode layout of at least one subunit electrode 21.1, 21.2, 22.1, 22.2, 23.1, 23.2, 24.1, 24.2, 24.3, 25.1, 25.2, 25.3, 26.1, 26.2, 26.3, wherein the subunit electrode layout is in reference to a subunit reference system. In this subunit electrode layout, each one of the at least one subunit electrodes 21.1, 21.2, 22.1, 22.2, 23.1, 23.2, 24.1, 24.2, 24.3, 25.1, 25.2, 25.3, 26.1, 26.2, 26.3 has a local position, a shape and a size in the subunit reference system and is assigned to a class of electrodes, wherein the respective class of electrodes is associated with a type of voltage pattern to be applied to the electrodes belonging to the respective class of electrodes.

The type information further includes a layout subunit position identifier 28 for identifying a position of the subunit electrode layout in the global reference system. In the present example, this layout subunit position identifier 28 is a point in the subunit electrode layout.

The method further includes building up at least one segment of the layout of electrodes by assigning to each one of the at least two layout subunits 10.1, 10.2, 10.3, 10.4 one of the at least one layout subunit type 20 and positioning each one of the at least two layout subunits 10.1, 10.2, 10.3, 10.4 at a respective position along the layout path 70.

As mentioned already, the four layout subunits 10.1, 10.2, 10.3, 10.4 of the layout of electrodes 1 shown in FIG. 1 are of the layout subunit type 20 illustrated in FIGS. 2*a* and 2*b*. This layout subunit type 20 is defined with its type information as follows: The subunit electrode layout of the type information is a multiple electrode layout of fifteen subunit electrodes 21.1, 21.2, 22.1, 22.2, 23.1, 23.2, 24.1, 24.2, 24.3, 25.1, 25.2, 25.3, 26.1, 26.2, 26.3 in total. Thereby, the subunit electrode layout is arranged in a plane which corresponds to the plane of FIG. 2*a*. Furthermore, as illustrated in FIG. 2*a*, the type information of the layout subunit type 20 includes a layout subunit orientation identifier 27 for identifying an orientation of the subunit electrode layout in the global reference system and for orienting each layout subunit 10.1, 10.2, 10.3, 10.4 of the layout subunit type 20 relative to the layout path 70 at a position where the respective layout subunit 10.1, 10.2, 10.3, 10.4 is to be positioned or is positioned along the layout path 70. In the present example, layout subunit orientation identifier 27 is arranged along a course of a layout path segment in reference to the subunit reference system. Thus, the type information of the layout subunit type 20 indicates the course of the layout path segment in reference to the subunit reference system, wherein the course of the layout path segment forms a segment of the layout path 70 when a layout subunit 10.1, 10.2, 10.3, 10.4 of the layout subunit type 20 is positioned at its position along the layout path 70 and oriented properly with respect to the layout path 70 at its position along the layout path 70.

The subunit electrodes 21.1, 21.2, 22.1, 22.2, 23.1, 23.2, 24.1, 24.2, 24.3, 25.1, 25.2, 25.3, 26.1, 26.2, 26.3 of the subunit electrode layout of the layout subunit type 20 shown in FIGS. 2*a* and 2*b* are assigned to different classes of electrodes. When looking in the plane of the electrode layout in a direction perpendicular to the layout subunit orientation identifier 27, on each end of the subunit electrode layout, a subunit electrode 21.1, 21.2 is arranged. These two subunit electrodes 21.1, 21.2 are assigned to a same class of electrodes. The voltage pattern associated with this class of electrodes is a constant DC voltage. The purpose of these two subunit electrodes 21.1, 21.2 is to confine the ions to a space between them. For simplicity reasons, these two subunit electrodes 21.1, 21.2 are thus referred to as lateral confinement DC electrodes 21.1, 21.2. The other subunit electrodes 22.1, 22.2, 23.1, 23.2, 24.1, 24.2, 24.3, 25.1, 25.2, 25.3, 26.1, 26.2, 26.3 of the subunit electrode layout of the type information of the layout subunit type 20, 120 are assigned to classes of electrodes each being associated with a type of voltage pattern being a periodic voltage pattern having a frequency and including a phase identifier referring to a reference phase of the respective of the periodic voltage pattern.

When starting at a first one of the two lateral confinement DC electrodes 21.1 and going through the subunit electrode layout in the direction perpendicular to the layout subunit orientation identifier 27 to the second one of the two lateral confinement DC electrodes 21.2, the further subunit electrodes 22.1, 22.2, 23.1, 23.2, 24.1, 24.2, 24.3, 25.1, 25.2, 25.3, 26.1, 26.2, 26.3 are arranged as follows:

First, there is a subunit electrode 22.1 arranged which extends over a length of the subunit electrode layout in the direction of the layout subunit orientation identifier 27. This subunit electrode 22.1 is referred to as first lateral confinement AC electrode 22.1. Second, there are three subunit electrodes 24.1, 24.2, 24.3 arranged one after the other along the layout subunit orientation identifier 27. These three subunit electrodes 24.1, 24.2, 24.3 are referred to as first three traveling-wave-electrodes 24.1, 24.2, 24.3. Third, there is a subunit electrode 23.1 arranged which extends over a length of the subunit electrode layout in the direction of the layout subunit orientation identifier 27. This subunit electrode 23.1 is referred to as second lateral confinement AC electrode 23.1. Fourth, there are further three subunit electrodes 25.1, 25.2, 25.3 arranged one after the other along the layout subunit orientation identifier 27. These three subunit electrodes 25.1, 25.2, 25.3 are referred to as second three traveling-wave-electrodes 25.1, 25.2, 25.3. Fifth, there is a subunit electrode 22.2 arranged which extends over a length of the subunit electrode layout in the direction of the layout subunit orientation identifier 27. This subunit electrode 22.2 is referred to as third lateral confinement AC electrode 22.2. Sixth, there are three subunit electrodes 26.1, 26.2, 26.3 arranged one after the other along the layout subunit orientation identifier 27. These three subunit electrodes 26.1, 26.2, 26.3 are referred to as third three traveling-wave-electrodes 26.1, 26.2, 26.3. Seventh, there is a subunit electrode 23.2 arranged which extends over a length of the subunit electrode layout in the direction of the layout subunit orientation identifier 27. This subunit electrode 23.2 is referred to as fourth lateral confinement AC electrode 23.2.

Thereby, the first and the third lateral confinement AC electrodes 22.1, 22.2 are both assigned to a same first class of electrodes which is associated to a periodic voltage pattern with a first radio frequency and a first maximum amplitude and which includes a phase identifier referring to a first reference phase of the respective of the periodic voltage pattern. Furthermore, the second and the fourth lateral confinement AC electrodes 23.1, 23.2 are both assigned to a same second class of electrodes which is associated to a periodic voltage pattern with the first radio frequency and the first maximum amplitude but which includes a phase identifier referring to a second reference phase which differs by 180° of the first reference phase. Thereby, the first radio frequency is in a range from 500 kHz to 5 MHz. In variants, the first radio frequency is in a range from 100 kHz to 50 MHz, from 250 kHz to 50 MHz, from 500 kHz to 50 MHz, from 100 kHz to 5 MHz, or from 250 kHz to 5 MHz, respectively. Thus, when operating an arrangement of electrodes arranged in the subunit electrode layout, the first, second, third and fourth lateral confinement AC electrodes 22.1, 22.2, 23.1, 23.2 generate a pseudopotential repelling the ions and thus preventing the ions of approaching layout too closely the plane of the subunit electrode layout.

The first three traveling-wave-electrodes 24.1, 24.2, 24.3, the second three traveling-wave-electrodes 25.1, 25.2, 25.3 and third three traveling-wave-electrodes 26.1, 26.2, 26.3 are all assigned to classes of electrodes which are subsumable into a same superclass of traveling-wave-electrodes. These classes of electrodes are all associated with periodic voltage pattern having a same second frequency and a same second amplitude. Thereby, the second frequency is in a range from 1 kHz to 100 kHz. In a variant, the second frequency is in a range from 1 kHz to 80 kHz. In another variant, the second frequency is in a range from 10 kHz to 80 kHz. In other variants however, the second frequency is in a range from 1 kHz to 50 MHz, from 1 kHz to 5 MHz, from 1 kHz to 500 kHz, from 1 kHz to 100 kHz, from 100 kHz to 50 MHz, from 250 kHz to 50 MHz, from 500 kHz to 50 MHz, from 100 kHz to 5 MHz, from 250 kHz to 5 MHz, or from 500 kHz to 5 MHz.

The group of the first three traveling-wave-electrodes 24.1, 24.2, 24.3, the group of the second three traveling-wave-electrodes 25.1, 25.2, 25.3 and the group of the third three traveling-wave-electrodes 26.1, 26.2, 26.3 are organised in the same way. The first one of the three traveling-wave-electrodes 24.1, 25.1, 26.1 seen along the layout subunit orientation identifier 27 is assigned to a class of electrodes having a phase identifier referring to a third reference phase. The second one of the three traveling-wave-electrodes 24.2, 25.2, 26.2 seen along the layout subunit orientation identifier 27 is assigned to a class of electrodes associated having a phase identifier referring to a fourth reference phase. The third one of the three traveling-wave-electrodes 24.3, 25.3, 26.3 seen along the layout subunit orientation identifier 27 is assigned to a class of electrodes having a phase identifier referring to a fifth reference phase. Thereby, the fifth reference phase is 120° behind the fourth reference phase, while the fourth reference phase is 120° behind the third reference phase. Thus, each group of the group of the first three traveling-wave-electrodes 24.1, 24.2, 24.3, the group of the second three traveling-wave-electrodes 25.1, 25.2, 25.3 and the group of the third three traveling-wave-electrodes 26.1, 26.2, 26.3 is a group of conveying electrodes as described in EP 3 561 853 A1. Even more, in each group of the group of the first three traveling-wave-electrodes 24.1, 24.2, 24.3, the group of the second three traveling-wave-electrodes 25.1, 25.2, 25.3 and the group of the third three traveling-wave-electrodes 26.1, 26.2, 26.3, the three traveling-wave-electrodes are assigned to classes of electrodes subsumable into the same superclass of traveling-wave-electrodes and are arranged sequentially along the layout path segment for enabling generating a traveling wave along the layout path segment, the traveling wave having a wavelength corresponding to a length of the layout subunit type 20 measured along the layout path segment of the layout subunit type 20. Thus, each group of the group of the first three traveling-wave-electrodes 24.1, 24.2, 24.3, the group of the second three traveling-wave-electrodes 25.1, 25.2, 25.3 and the group of the third three traveling-wave-electrodes 26.1, 26.2, 26.3 is arranged in a subunit wavelength unit extending over an area having a length measured along the layout path segment of the layout subunit type 20, wherein this length is the wavelength of the traveling wave. As the layout of electrodes 1 shown in FIG. 1 comprises the four layout subunits 10.1, 10.2, 10.3, 10.4 of the layout subunit type 20, at each of the four layout subunits 10.1, 10.2, 10.3, 10.4, the subunit wavelength unit of the respective layout subunit 10.1, 10.2, 10.3, 10.4 forms a global wavelength subunit in the layout of electrodes 1. As will be shown later in the context of FIGS. 8, 9, 10*a*, 10*b*, 10*c*, 11*a* and 11*b*, these global wavelength subunits in the layout of electrodes 1 can be generated with a different procedure.

In contrast to FIG. 2*a*, FIG. 2*b* shows the subunit electrodes 21.1, 21.2, 22.1, 22.2, 23.1, 23.2, 24.1, 24.2, 24.3,

25.1, 25.2, 25.3, 26.1, 26.2, 26.3 of the subunit electrode layout of the layout subunit type 20 in dashed lines. Furthermore, FIG. 2*b* shows a subunit wiring layout 29 as given by the type information of the layout subunit type 20. This subunit wiring layout 29 is for wiring the at least one subunit electrode 21.1, 21.2, 22.1, 22.2, 23.1, 23.2, 24.1, 24.2, 24.3, 25.1, 25.2, 25.3, 26.1, 26.2, 26.3 of the subunit electrode layout, the subunit wiring layout 29 being in reference to the subunit reference system. Thereby, the subunit wiring layout 29 describes connections of those of the subunit electrodes 21.1, 21.2, 22.1, 22.2, 23.1, 23.2, 24.1, 24.2, 24.3, 25.1, 25.2, 25.3, 26.1, 26.2, 26.3 which are assigned to the same class of electrodes.

Furthermore, the subunit wiring layout 29 provides for each class of electrodes present in the subunit electrode layout a connection point 30.1, 30.2, 30.3, 30.4, 30.5, 30.6 at a local position in the respective of the subunit reference system. These connection points 30.1, 30.2, 30.3, 30.4, 30.5, 30.6 are for connecting the subunit wiring layout 29 into a global wiring layout 2. Thus, when building up the at least one segment of the layout of electrodes 1 by assigning to each one of the at least two layout subunits 10.1, 10.2, 10.3, 10.4 one of the at least one layout subunit type 20 and positioning each one of the at least two layout subunits 10.1, 10.2, 10.3, 10.4 at a respective position along the layout path 70, the respective of the subunit wiring layouts 29 are connected into the global wiring layout 2 by using the respective connection point 30.1, 30.2, 30.3, 30.4, 30.5, 30.6 when defining the global wiring layout 2.

Figure 3:
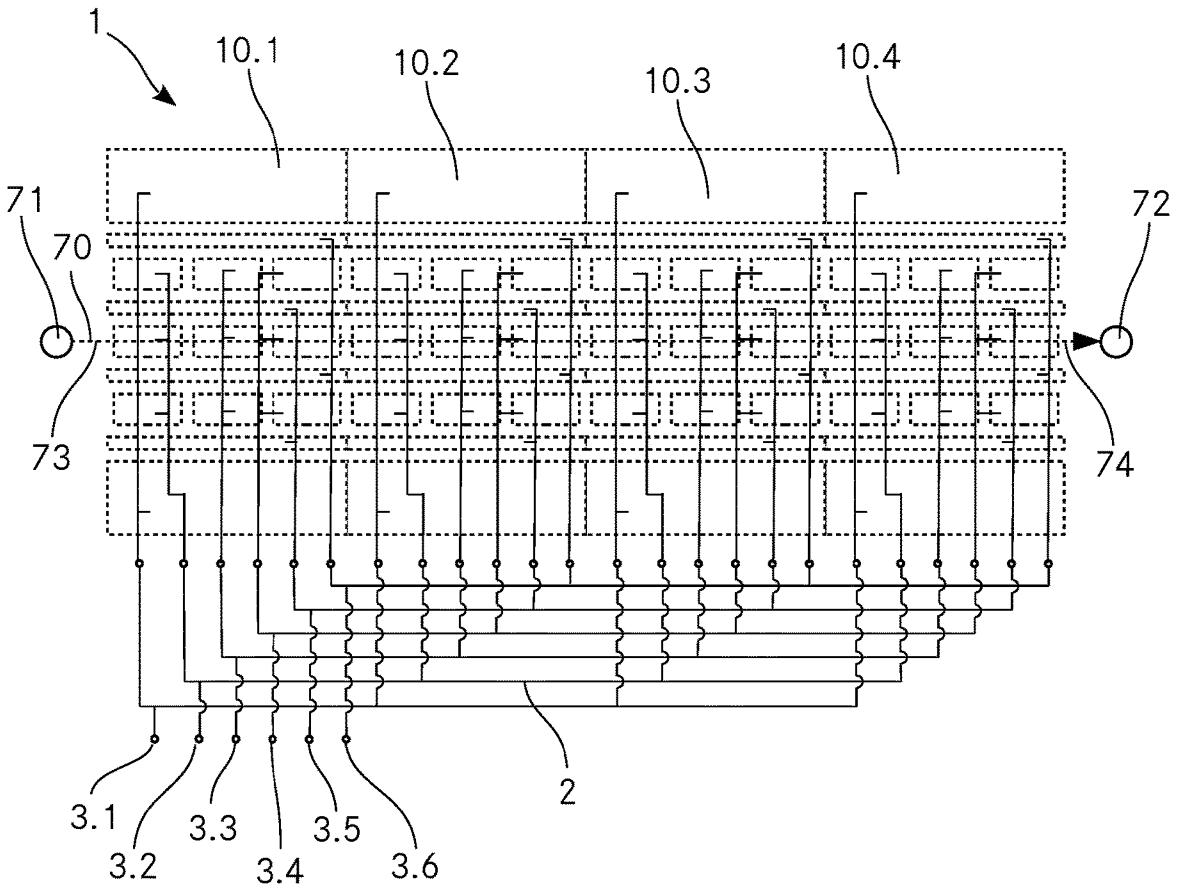

FIG. 3 shows the layout of electrodes 1 of FIG. 1, wherein the electrodes of the layout of electrodes 1 are shown in dashed lines. In contrast to FIG. 1, FIG. 3 shows additionally the global wiring layout 2 in reference to the global reference system.

As visible in FIG. 3, the global wiring layout 2 describes a connection of all electrodes of the layout of electrodes 1 which are assigned to the same class of electrodes. Thereby, the global wiring layout 2 provides for each class of electrodes present in the global wiring layout 2 a connection point 3.1, 3.2, 3.3, 3.4, 3.5, 3.6 for connecting the electrodes of the respective class of electrodes with a voltage source for applying the voltage pattern associated to the respective class of electrodes to the respective electrodes.

For manufacturing an arrangement of electrodes 80 arranged in the layout of electrodes 1 and wired with the global wiring layout 2, the layout of electrodes 1 and the global wiring layout 2 are provided in a codification for manufacturing a printed circuit board carrying electrodes arranged in the layout of electrodes 1 and wired in the global wiring layout. This codification is in a known script format used by the manufacturing machine for manufacturing the printed circuit board.

Figure 4:
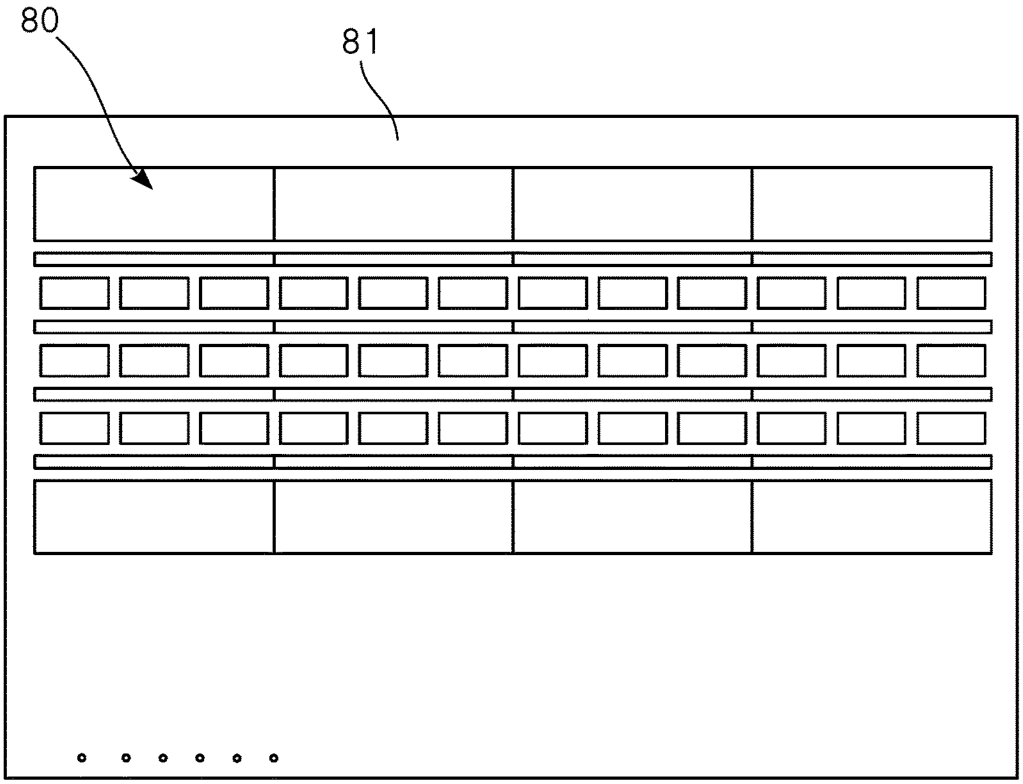

FIG. 4 shows a simplified schematic view of an arrangement of electrodes 80 with electrodes arranged in the layout of electrodes 1 and wired with the global wiring layout 2 on a printed circuit board 81. This arrangement of electrodes 80 has been manufactured with a method for manufacturing an arrangement of electrodes 80 for an ion guide for transporting ions along an ion path comprising the electrodes arranged in a layout of electrodes 1 along said ion path for transporting the ions along the ion path, wherein the layout of electrodes 1 is generated with the above described method for generating the layout of electrodes 1 for the ion guide for transporting ions along the ion path and wherein the arrangement of electrodes 80 is manufactured based on the layout of electrodes 1.

Figure 5:
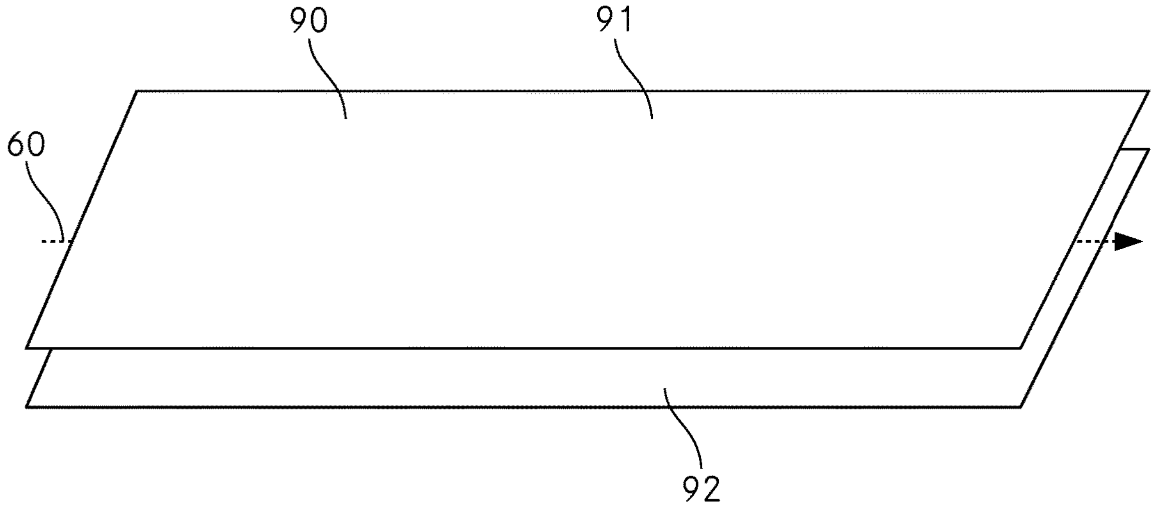

FIG. 5 shows a simplified schematic view of an ion guide 90 comprising two printed circuit boards 91, 92. These printed circuit boards 91, 92 are each arranged in a plane and are arranged parallel to each other at a distance from each other. Between the two printed circuit boards 91, 92, the ion path 60 is arranged. Thereby, the two printed circuit boards 91, 92 are identical to the printed circuit board 81 shown in FIG. 4 and have been generated and manufactured with the methods described above for the printed circuit board 81. Thus, the ion guide 90 has been generated with a method for generating an ion guide 90 for transporting ions along an ion path 60 comprising electrodes arranged in a layout of electrodes 1 along the ion path 60 for transporting the ions along the ion path 60, wherein the layout of electrodes 1 for the ion guide 90 for transporting the ions along the ion path 60 is generated with the above described method for generating the layout of electrodes 1 for the ion guide 90 for transporting ions along the ion paths 60. Thereby, the ion path 60 and the corresponding layout path 70 have been defined first and the layout of the electrodes 1 has been generated with the method for generating the layout of electrodes 1 second.

The ion guide 90 has been manufactured by a method for manufacturing an ion guide 90 for transporting ions along an ion path 60 by generating the ion guide 90 with the method for generating an ion guide 90 for transporting ions along an ion path 60 comprising electrodes arranged in a layout of electrodes 1 along the ion path 60 for transporting the ions along the ion path 60 and by subsequently manufacturing the ion guide 90. Thereby, when manufacturing the ion guide 90, the arrangement of electrodes 80 for the ion guide 90 has been manufactured with the above described method for manufacturing an arrangement of electrodes 80 for an ion guide 90 for transporting ions along an ion path 60 comprising the electrodes arranged in a layout of electrodes 1 along the ion path 60 for transporting the ions along the ion path 60, wherein the arrangement of electrodes 80 has been manufactured based on the layout of electrodes 1 and has been manufactured with the above described method for manufacturing the arrangement of electrodes 1 for the ion guide 90 for transporting ions along an ion path 60 comprising the electrodes arranged in a layout of electrodes 1 along said ion path 60 for transporting the ions along the ion path 60.

All these above described methods are advantageously employed in a computer program product. This is obtained with a computer program product comprising instructions which, when the program is executed by a computer, cause the computer to carry out the respective method.

Figure 6:
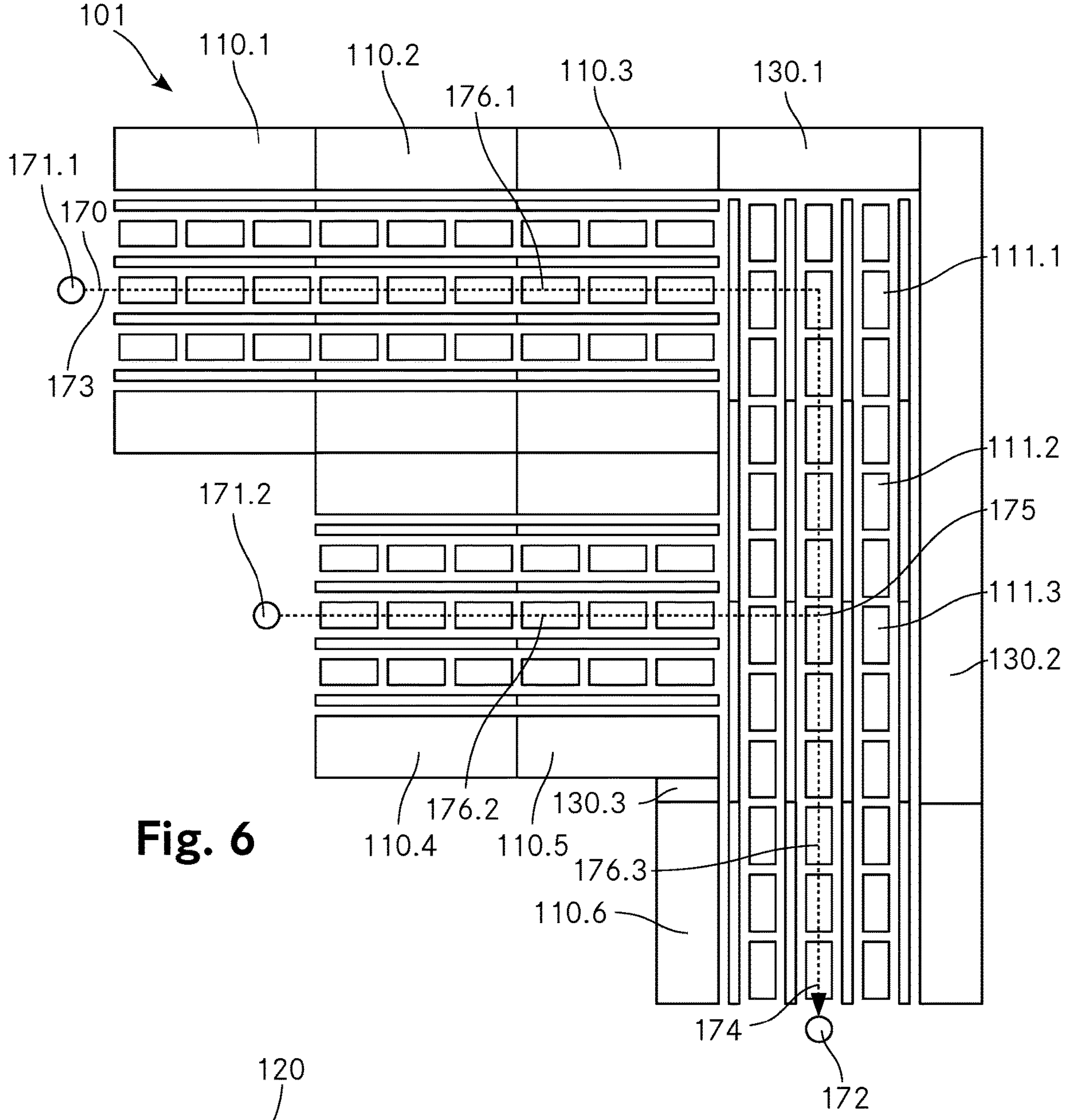

FIG. 6 shows another layout of electrodes 101 generated with the method according to the invention, wherein the layout of electrodes 101 is for an ion guide for transporting ions along an ion path, the ion guide comprising electrodes arranged in the layout of electrodes 101 along the ion path for transporting the ions along the ion path. In this embodiment, the ion path has two different ion path start positions, a junction and an ion path end position. Arrangements of electrodes with this layout of electrodes 101 can be manufactured and incorporated in an ion guide as described above.

When generating the layout of electrodes 101 shown in FIG. 6, a layout path 170 corresponding to the ion path is assumed. Thus, the layout path 170 has a first layout path start position 171.1 corresponding to the first ion path start position, a second layout path start position 171.2 corresponding to the second ion path start position, a layout path end position 172 corresponding to the ion path end position, a layout path course 173 corresponding to the ion path course and a layout path transport direction 174 corresponding to the ion path transport direction. Furthermore, the layout path 170 provides a junction 175. In this junction 175, a first branch 176.1 of the layout path 170 which comes from the first layout path start position 171.1 merges with a second branch 176.2 of the layout path 170 which comes from the second layout path start position 171.2. From this junction 175, a third branch 176.3 of the layout path 170 leads to the layout path end position 172.

Figure 7:
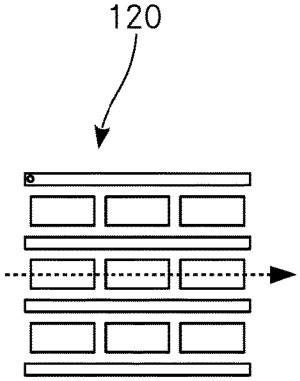

The layout of electrodes 101 shown in FIG. 6 includes in total six layout subunits 110.1, 110.2, 110.3, 110.4, 110.5, 110.6 which are of the layout subunit type 20 illustrated in FIGS. 2*a* and 2*b*. Furthermore, the layout of electrodes 101 shown in FIG. 6 includes three layout subunits 111.1, 111.2, 111.3 of a second layout subunit type 120. This second layout subunit type 120 is illustrated in FIG. 7. It is in most parts identical to the layout subunit type 20 illustrated in FIGS. 2*a* and 2*b*. As only difference, the second layout subunit type 120 however provides a subunit electrode layout without lateral confinement DC electrodes 21.1, 21.2 and consequently a subunit wiring layout with no wiring of any lateral confinement DC electrodes 21.1, 21.2.

As shown in FIG. 6, when starting from the first layout path start position 171.1 and following the first branch 176.1 of the layout path 170 to the junction 175 and subsequently following the third branch 176.2 of the layout path 170 to the layout path end position 172, there are first three layout subunits 110.1, 110.2, 110.3 of the layout subunit type 20 of FIGS. 2*a*, 2*b* arranged along a straight horizontal line. After the third of these layout subunits 110.3, a fourth layout subunit 111.1 of the second layout subunit type 120 is arranged, wherein this fourth layout subunit 111.1 is rotated by 90° clockwise as compared to the first three layout subunits 110.1, 110.2, 110.3. Thus, the layout path 170 provides a kink at the position of the fourth layout subunit 111.1.

After the fourth layout subunit 111.1, a fifth and a sixth subunit layout 111.2, 111.3, both of the second layout subunit type 120 are arranged on a straight line downwards from the fourth layout subunit 111.1, this fifth and sixth subunit layout 111.2, 111.3 being oriented in the same orientation as the fourth layout subunit 111.1. On this straight line downwards, after the sixth layout subunit 111.3, a seventh layout subunit 110.6 of the layout subunit type 20 of FIGS. 2*a*, 2*b* is arranged in the same orientation as the fourth, fifth and sixth layout subunit 111.1, 111.2, 111.3, leading to the layout path end position 172.

In the layout of electrodes 101 shown in FIG. 6, the junction 175 of the layout path 170 is arranged in the area of the fifth and sixth layout subunit 111.2, 111.3. Thereby, the second branch 176.2 of the layout path 170 starting from the second layout path start position 171.2 is arranged parallel to the beginning of the first branch 176.1 of the layout path 170. It starts with an eighth and a ninth layout subunit 110.4, 110.5 of the layout subunit type 20 of FIGS. 2*a*, 2*b* being oriented in the same orientation as the first three layout subunits 110.1, 110.2, 110.3. Thereby, the ninth layout subunit 110.5 connects to the fifth and sixth layout subunit 111.2, 111.3, somewhat shifted upwards from the centre of the sixth layout subunit 111.3. Thereby, the second branch 176.2 of the layout path 170 enters at the height of the sixth layout subunit 111.3 into previously described the vertical part of the layout path 170 to form the junction 175.

This way, a segment of the layout of electrodes 101 is built up by assigning to each one of the nine layout subunits 110.1, 110.2, 110.3, 110.4, 110.5, 110.6, 111.1, 111.2, 111.3 one of the two layout subunit types 20, 120, orienting each one of the nine layout subunits 110.1, 110.2, 110.3, 110.4, 110.5, 110.6, 111.1, 111.2, 111.3 and positioning each one of the nine layout subunits 110.1, 110.2, 110.3, 110.4, 110.6, 111.1, 111.2, 111.3 at a respective position along the layout path 170.

After having built this segment of the layout of electrodes 101, the three gaps along the layout path 170 with no lateral confinement DC electrode, a corresponding lateral confinement DC electrode 130.1, 130.2, 130.3 is arranged. These lateral confinement DC electrodes 130.1, 130.2, 130.3 are assigned to the same class of electrodes as the lateral confinement DC electrodes 21.1, 21.2 of the layout subunit type 20 illustrated in FIGS. 2*a*, 2*b*. Thus, when defining the global wiring layout of the layout of electrodes 101 shown in FIG. 6, the lateral confinement DC electrodes 130.1, 130.2, 130.3 are connected with the lateral confinement DC electrodes of the respective layout subunits 110.1, 110.2, 110.3, 110.4, 110.5, 110.6.

Figure 8:
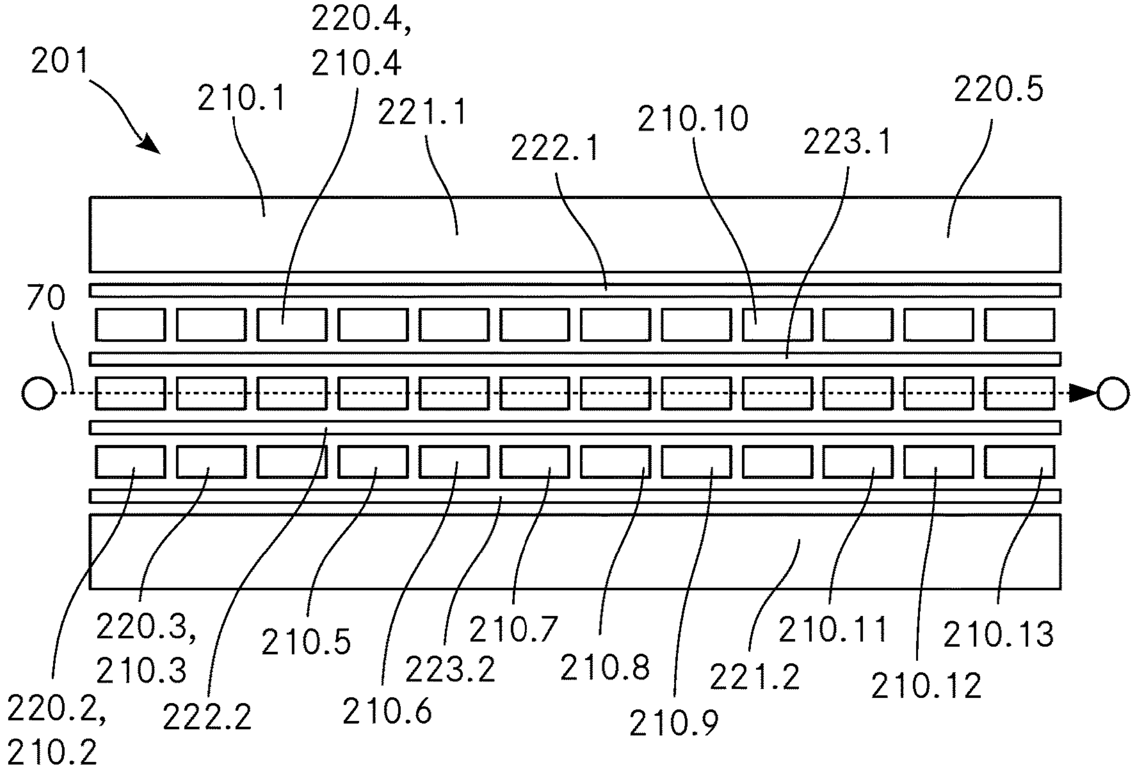

FIG. 8 shows yet another layout of electrodes 201 according to the invention for an ion guide for transporting ions along an ion path, the ion guide comprising electrodes arranged in the layout of electrodes 201 along the ion path for transporting the ions along the ion path. Thereby, the ion path and the layout path 70 are the same as the ones used in the layout of electrodes 1 shown in FIG. 1. As well, the layout of electrodes 201 shown in FIG. 8 is very similar to the layout of electrodes 1 shown in FIG. 1. However, the layout of electrodes 201 shown in FIG. 8 comprises lateral confinement DC electrodes 221.1, 221.2 and lateral confinement AC electrodes 222.1, 222.2, 223.1, 223.2 which extend along the entire layout of electrodes 201. This difference as compared to the layout of electrodes 1 shown in FIG. 1 where four layout subunits 10.1, 10.2, 10.3, 10.4 are arranged consecutively along the layout path 70 and where each of the four layout subunits 10.1, 10.2, 10.3, 10.4 comprises lateral confinement DC electrodes and lateral confinement AC electrodes extending over a length of the respective layout subunit 10.1, 10.2, 10.3, 10.4 is due to the fact that the layout of electrodes 201 shown in FIG. 8 has been generated with a different procedure with the help of differently defined layout subunit types 220.1, 220.2, 220.3, 220.4, 220.5. These layout subunit types 220.1, 220.2, 220.3, 220.4, 220.5 are illustrated in FIGS. 9, 10*a*, 10*b*, 10*c*, 11*a* and 11*b* and described in the following.

Figure 9:
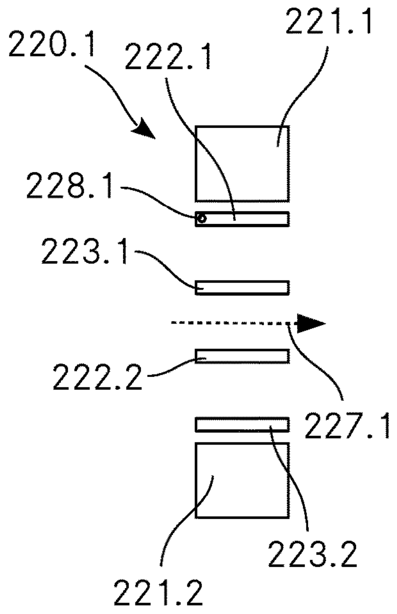

In FIG. 9, a third layout subunit type 220.1 used to generate the layout of electrodes 201 of FIG. 8 is shown. This third layout subunit type 220.1 includes a layout subunit orientation identifier 227.1 and a layout subunit position identifier 228.1 like the subunit layout type 20 illustrated in FIG. 2*a*. Furthermore, the third layout subunit type 220.1 of FIG. 9 includes lateral confinement DC electrodes 221.1, 221.2 and lateral confinement AC electrodes 222.1, 222.2, 223.1, 223.2 arranged and positioned relative to the layout subunit orientation identifier 227.1 and the layout subunit position identifier 228.1 in the same way as the corresponding electrodes are in the subunit layout type 20 illustrated in FIG. 2*a*. However, these lateral confinement DC electrodes 221.1, 221.2 and lateral confinement AC electrodes 222.1, 222.2, 223.1, 223.2 are shorter measured along the layout subunit orientation identifier 227.1 than the ones of first layout subunit type 20 of FIG. 2*a*. Nonetheless, the type information of the third layout subunit type 220.1 shown in FIG. 9 includes a subunit wiring layout which describes connections of those of the subunit electrodes 221.1, 221.2, 222.1, 222.2, 223.1, 223.2 which are assigned to the same class of electrodes and provides for each class of electrodes present in the subunit electrodes layout a connection point, similar to the subunit wiring layout 29 described in the context of FIG. 2*b*.

Figure 10A:
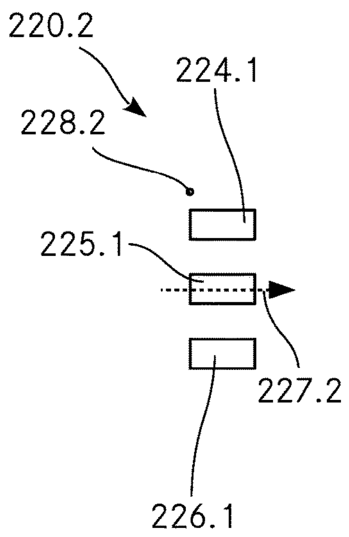

In FIG. 10*a*, a second layout subunit type 220.2 used to generate the layout of electrodes 201 of FIG. 8 is shown. This fourth layout subunit type 220.2 includes a layout subunit orientation identifier 227.2 and a layout subunit position identifier 228.2 like the subunit layout type 20 illustrated in FIG. 2*a*. Furthermore, the fourth layout subunit type 220.2 of FIG. 10*a* includes three traveling-wave-electrodes 224.1, 225.1, 226.1 arranged and positioned relative to the layout subunit orientation identifier 227.2 and the layout subunit position identifier 228.2 in the same way as the first traveling-wave-electrodes 24.1, 25.1, 26.1 of the three groups of traveling-wave-electrodes 24.1, 24.2, 24.3, 25.1, 25.2, 25.3, 26.1, 26.2, 26.3 in the subunit layout type 20 illustrated in FIG. 2*a*. These traveling-wave-electrodes 224.1, 225.1, 226.1 of the fourth subunit layout type 220.2 illustrated in FIG. 10*a* have a same size and shape as the corresponding electrodes in the subunit layout type 20 illustrated in FIG. 2*a* and are as well assigned to the class of electrodes having a phase identifier referring to the third reference phase. The type information of the fourth layout subunit type 220.2 furthermore includes a subunit wiring layout which describes a connection of the traveling-wave-electrodes 224.1, 225.1, 226.1 and provides a connection point, similar to the subunit wiring layout 29 described in the context of FIG. 2*b*.

Figure 10B:
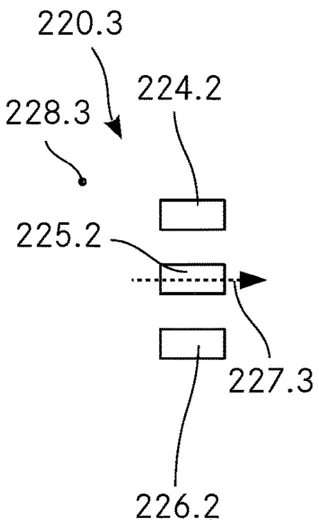

In FIG. 10*b*, a fifth layout subunit type 220.3 used to generate the layout of electrodes 201 of FIG. 8 is shown. This fifth layout subunit type 220.3 includes a layout subunit orientation identifier 227.3 and a layout subunit position identifier 228.3 like the subunit layout type 20 illustrated in FIG. 2*a*. Furthermore, the fifth layout subunit type 220.3 of FIG. 10*b* includes three traveling-wave-electrodes 224.2, 225.2, 226.2 arranged and positioned relative to the layout subunit orientation identifier 227.3 and the layout subunit position identifier 228.3 in the same way as the second traveling-wave-electrodes 24.2, 25.2, 26.2 of the three groups of traveling-wave-electrodes 24.1, 24.2, 24.3, 25.1, 25.2, 25.3, 26.1, 26.2, 26.3 in the subunit layout type 20 illustrated in FIG. 2*a*. These traveling-wave-electrodes 224.2, 225.2, 226.2 of the fifth subunit layout type 220.3 illustrated in FIG. 10*b* have a same size and shape as the corresponding electrodes in the subunit layout type 20 illustrated in FIG. 2*a* and are as well assigned to the class of electrodes having a phase identifier referring to the fourth reference phase. The type information of the fifth layout subunit type 220.3 furthermore includes a subunit wiring layout which describes a connection of the traveling-wave-electrodes 224.2, 225.2, 226.2 and provides a connection point, similar to the subunit wiring layout 29 described in the context of FIG. 2*b*.

Figure 10C:
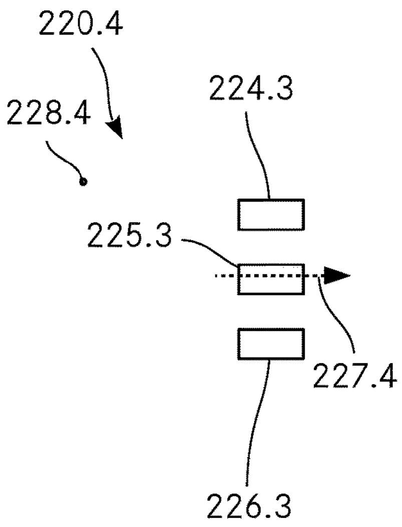

In FIG. 10*c*, a sixth layout subunit type 220.4 used to generate the layout of electrodes 201 of FIG. 8 is shown. This sixth layout subunit type 220.4 includes a layout subunit orientation identifier 227.4 and a layout subunit position identifier 228.4 like the subunit layout type 20 illustrated in FIG. 2*a*. Furthermore, the sixth layout subunit type 220.4 of FIG. 10*c* includes three traveling-wave-electrodes 224.3, 225.3, 226.3 arranged and positioned relative to the layout subunit orientation identifier 227.4 and the layout subunit position identifier 228.4 in the same way as the third traveling-wave-electrodes 24.3, 25.3, 26.3 of the three groups of traveling-wave-electrodes 24.1, 24.2, 24.3, 25.1, 25.2, 25.3, 26.1, 26.2, 26.3 in the subunit layout type 20 illustrated in FIG. 2*a*. These traveling-wave-electrodes 224.3, 225.3, 226.3 of the sixth subunit layout type 220.4 illustrated in FIG. 10*c* have a same size and shape as the corresponding electrodes in the subunit layout type 20 illustrated in FIG. 2*a* and are as well assigned to the class of electrodes having a phase identifier referring to the fifth reference phase. The type information of the sixth layout subunit type 220.4 furthermore includes a subunit wiring layout which describes a connection of the traveling-wave-electrodes 224.3, 225.3, 226.3 and provides a connection point, similar to the subunit wiring layout 29 described in the context of FIG. 2*b*.

Similar to the traveling-wave-electrodes 24.1, 24.2, 24.3, 25.1, 25.2, 25.3, 26.1, 26.2, 26.3 of the layout subunit type 20 shown in FIG. 2*a*, the traveling-wave-electrodes 224.1, 224.2, 224.3, 225.1, 225.2, 225.3, 226.1, 226.2, 226.3 of the fourth, fifth and sixth layout subunit type 220.2, 220.3, 220.4 are all assigned to classes of electrodes subsumable into the same superclass of traveling-wave-electrodes.

Figure 11A:
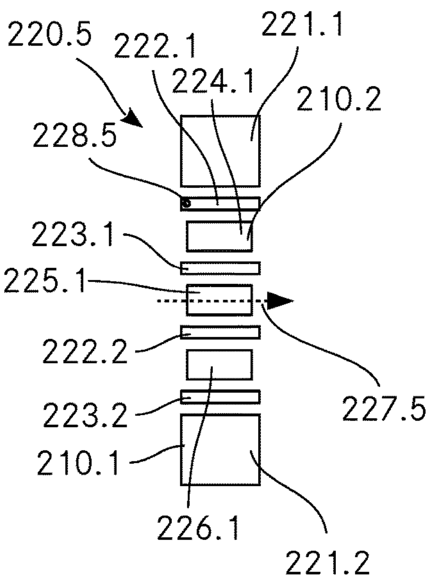
Figure 11B:
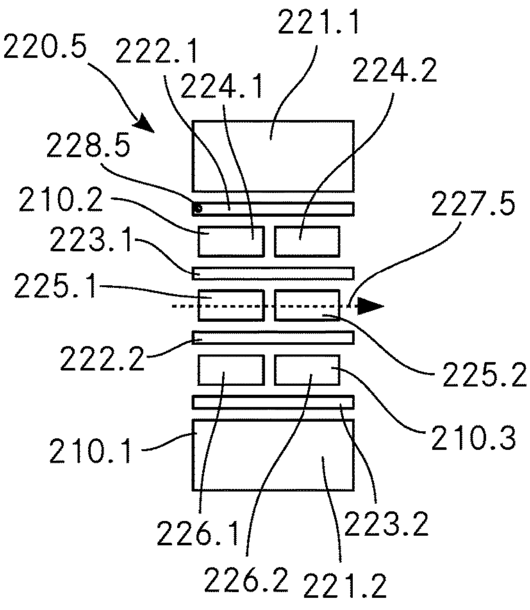

In FIGS. 11*a* and 11*b*, the procedure is illustrated with which the layout of electrodes 201 shown in FIG. 8 has been generated. As illustrated in FIG. 11*a*, first, a subunit layout 210.1 of the third layout subunit type 220.1 and a subunit layout 210.2 of the fourth layout subunit types 220.2 are positioned with their layout subunit orientation identifiers 227.1. 227.2 and layout subunit position identifiers 228.1, 228.2 coinciding at a position of a layout subunit orientation identifier 227.5 and a layout subunit position identifier 228.5, respectively, of a seventh layout subunit type 220.5 newly defined from the two subunit layout 210.1, 210.2 of the third and fourth layout subunit type 220.1, 220.2. Thereby, the subunit wiring layouts of the third and fourth layout subunit type 220.1, 220.2 are incorporated into the subunit wiring layout of the seventh subunit wiring layout 220.5.

Subsequently, the definition this seventh layout subunit type 220.5 is modified. Namely, a length of the seventh layout subunit type 220.5 measured along the layout orientation identifier 227.5 is adjusted as desired. Thereby, as illustrated in FIG. 11*b*, the lengths of the confinement DC electrodes 221.1, 221.2 and lateral confinement AC electrodes 222.1, 222.2, 223.1, 223.2 measured along the layout orientation identifier 227.5 are adjusted according to the modified length of the seventh layout subunit type 220.5. At the same time, the lengths of the traveling-wave-electrodes 224.1, 225.1, 226.1 of the second layout subunit 210.2 of the fourth layout subunit type 220.2 are maintained. As soon as the length of the seventh layout subunit type 220.5 measured along the layout orientation identifier 227.5 is sufficient to add a layout subunit 210.3 of the fifth layout subunit type 220.3 with its layout subunit position identifier 228.3 and its layout subunit orientation identifier 227.3 coinciding with the layout subunit position identifier 228.5 and layout subunit orientation identifier 227.5 of the seventh layout subunit type 220.5, a fifth layout subunit 210.3 of the fifth layout subunit type 220.3 with its traveling-wave-electrodes 224.2, 225.2, 226.2 and its subunit wiring layout is added to the seventh layout subunit type 220.5 with its layout subunit position identifier 228.3 and its layout subunit orientation identifier 227.3 coinciding with the layout subunit position identifier 228.5 and layout subunit orientation identifier 227.5 of the seventh layout subunit type 220.5. Thus, in the seventh layout subunit type 220.5 seen along the layout orientation identifier 227.5, there are now first traveling-wave-electrodes 224.1, 225.1, 226.1 having a phase identifier referring to the third reference phase and second traveling-wave-electrodes 224.2, 225.2, 226.2 having a phase identifier referring to the fourth reference phase.

With further increasing length of the seventh layout subunit type 220.5, the lengths of the confinement DC electrodes 221.1, 221.2 and lateral confinement AC electrodes 222.1, 222.2, 223.1, 223.2 measured along the layout orientation identifier 227.5 are adjusted further, and as soon as the length of the seventh layout subunit type 220.5 allows, a further layout subunit 210.4 of the sixth layout subunit type 220.4 with its traveling-wave-electrodes 224.3, 225.3, 226.3 and its subunit wiring layout is added to the seventh layout subunit type 220.5 with its layout subunit position identifier 228.4 and its layout subunit orientation identifier 227.4 coinciding with the layout subunit position identifier 228.5 and layout subunit orientation identifier 227.5 of the seventh layout subunit type 220.5. Thus, the seventh layout subunit type 220.5 now corresponds to the layout subunit type 20 illustrated in FIG. 2*a* and includes the traveling-wave-electrodes 224.1, 224.2, 224.3, 225.1, 225.2, 225.3, 226.1, 226.2, 226.3 of the fourth, fifth and sixth layout subunit type 220.2, 220.3, 220.4 assigned to classes of electrodes subsumable into the same superclass of traveling-wave-electrodes. Consequently, the traveling-wave-electrodes 224.1, 224.2, 224.3, 225.1, 225.2, 225.3, 226.1, 226.2, 226.3 of the seventh layout subunit type 220.5 are now arranged sequentially along the layout subunit orientation identifier 227.5 for enabling generating a traveling wave along the direction of the layout subunit orientation identifier 227.5, the traveling wave having a wavelength corresponding to a length of the layout subunit type 20 measured along the layout subunit orientation identifier 227.5 of the seventh layout subunit type 220.5.

As this procedure of increasing the length of the seventh layout subunit type 220.5 is continued, the lengths of the confinement DC electrodes 221.1, 221.2 and lateral confinement AC electrodes 222.1, 222.2, 223.1, 223.2 are increased further as described before. After adding the layout subunit 210.4 of the sixth layout subunit type 220.4, again a layout subunit 210.5 of the fourth layout subunit type 220.2 is added as soon as the length of the seventh layout subunit type 220.5 allows. Thereby, the traveling-wave-electrodes and the subunit wiring layout of the layout subunit 210.5 of the fourth layout subunit type 220.2 are appended at a same distance from the traveling-wave-electrodes of the layout subunit 210.4 of the sixth layout subunit type 220.4 as the traveling-wave-electrodes of the layout subunit 210.4 of the sixth layout subunit type 220.4 are distanced from the traveling-wave-electrodes of the layout subunit 210.3 of the fifth layout subunit type 220.3. Thus, the newly added layout subunit 210.5 of the fourth layout subunit type 220.2 is positioned with its subunit layout orientation identifier 227.2 oriented parallel to the layout subunit orientation identifier 227.5 of the seventh layout subunit type 220.5. However, the layout subunit position identifier 228.2 of the layout subunit 210.5 of the fourth layout subunit type 220.2 is moved by one wavelength from the layout subunit position identifier 228.5 of the seventh layout subunit type 220.5 in the direction of the layout subunit orientation identifier 227.5 of the seventh layout subunit type 220.5.

Ultimately, the length of the seventh layout subunit type 220.5 reaches the length of the layout of electrodes 201 shown in FIG. 8. At this length, the seventh layout subunit type 220.5 includes the layout subunit 210.1 of the third layout subunit type 220.1 illustrated in FIG. 9 with an amended length and includes the sequence of the layout subunits 210.2, 210.3, 210.4, 210.5, 210.6, 210.7, 210.8, 210.9, 210.10, 210.11, 210.12, 210.13 of the fourth, fifth and sixth layout subunit types 220.2, 220.3, 220.4 repeated four times like the traveling-wave-electrodes are repeated four times in the layout of electrodes 1 shown in FIG. 1 due to the sequential arrangement of the four layout subunits 10.1, 10.2, 10.3, 10.4 of the layout subunit type 20 of FIG. 2*a*. Thus, the layout of electrodes 201 shown in FIG. 8 is one large layout subunit of the modified seventh layout subunit type 220.5. The above described method of modifying the seventh layout subunit type 220.5 based on the third, fourth, fifth and sixth layout subunit type 220.1, 220.2. 220.3, 220.4 is advantageously implemented in a computer program product. This is obtained with a computer program product comprising instructions which, when the program is executed by a computer, cause the computer to carry out the respective method.

The invention is not limited to the above described embodiments. Different variants and variations in the methods as well as in the layouts of electrodes, designs of the ion guides and manufacturing procedures are possible. Furthermore, the ion guides can be generated and manufactured with different layouts of electrodes than described above.

In summary, it is to be noted that a method for generating a layout of electrodes for an ion guide for transporting ions along an ion path is provided, the ion guide comprising electrodes arranged in the layout of electrodes along the ion path, that enables a simple and easy way for obtaining a flawless layout of electrodes, enabling a proper functionality of the ion guide.

The invention claimed is:

1. A method for generating a layout of electrodes for an ion guide for transporting ions along an ion path, said ion guide comprising electrodes arranged in said layout of electrodes along said ion path for transporting said ions along said ion path, wherein for generating said layout of electrodes, a layout path corresponding to said ion path is assumed and said layout of electrodes is generated along said layout path, wherein said layout of electrodes and said layout path are in reference to a global reference system, wherein said layout of electrodes includes at least two layout subunits which are arranged in succession along said layout path, wherein each one of said at least two layout subunits is of one of at least one layout subunit type, a) wherein said method includes defining said at least one layout subunit type, wherein each one of said at least one layout subunit type includes type information, said type information being adopted by each layout subunit of the respective one of said at least one layout subunit type, wherein said type information includes a subunit electrode layout of at least one subunit electrode, said subunit electrode layout being in reference to a subunit reference system, wherein in said subunit electrode layout, each one of said at least one subunit electrode has a local position in said subunit reference system and is assigned to a class of electrodes, wherein the respective class of electrodes is associated with a type of voltage pattern to be applied to the electrodes belonging to the respective said class of electrodes, wherein said type information includes a layout subunit position identifier for identifying a position of said subunit electrode layout in said global reference system, b) wherein said method includes building up at least one segment of said layout of electrodes by assigning to each one of said at least two layout subunits one of said at least one layout subunit type and positioning each one of said at least two layout subunits at a respective position along said layout path.

2. The method according to claim 1, wherein said type information of at least one of said at least one layout subunit type includes a layout subunit orientation identifier for identifying an orientation of said subunit electrode layout in said global reference system and for orienting each layout subunit of the respective one of said at least one layout subunit type relative to said layout path at a position where the respective of said layout subunit is to be positioned or is positioned along said layout path.

3. The method according to claim 1, wherein said type information of at least one of said at least one layout subunit type indicates a course of a layout path segment in reference to said subunit reference system, wherein for each one of said at least two layout subunits of the respective layout subunit type, when the respective one of said at least two layout subunits is positioned at the respective said position along said layout path, said course of said layout path segment forms a segment of said layout path.

4. The method according to claim 1, wherein at least one of said at least one subunit electrode of said subunit electrode layout of said type information of at least one of said at least one layout subunit type is assigned to a class of electrodes being associated with a type of voltage pattern being a DC voltage.

5. The method according to claim 1, wherein at least one of said at least one subunit electrode of said subunit electrode layout of said type information of at least one of said at least one layout subunit type is assigned to a class of electrodes being associated with a type of voltage pattern being a periodic voltage pattern having a frequency.

6. The method according to claim 5, wherein said class of electrodes being associated with said type of voltage pattern being a periodic voltage pattern having a frequency includes a phase identifier referring to a reference phase of the respective of said periodic voltage pattern.

7. The method according to claim 6, wherein in the layout of electrodes, at least two or at least three subunit electrodes are assigned to different classes of electrodes being associated with a type of voltage pattern being a periodic voltage pattern having a same frequency wherein each of said different classes of electrodes associated with a type of voltage pattern being a periodic voltage pattern having said same frequency includes a different phase identifier referring to a different reference phase of the respective of said periodic voltage pattern.

8. The method according to claim 7, wherein in the layout of electrodes, two or of said at least three subunit electrodes assigned to different classes of electrodes being associated with a type of voltage pattern being a periodic voltage pattern having said same frequency are assigned to two different classes of electrodes, wherein the respective said two different classes of electrodes include phase identifiers referring to reference phases differing by about 180° from each other.

9. The method according to claim 7, wherein in the layout of electrodes, at least three of said at least three subunit electrodes assigned to different classes of electrodes being associated with a type of voltage pattern being a periodic voltage pattern having said same frequency are traveling-wave-electrodes and assigned to different classes of electrodes, wherein the respective classes of electrodes include phase identifiers referring to different reference phases and are subsumable into a same superclass of traveling-wave electrodes.

10. The method according to claim 7, wherein in the layout of electrodes, two or of said at least three subunit electrodes assigned to different classes of electrodes being associated with a type of voltage pattern being a periodic voltage pattern having said same frequency are assigned to two different classes of electrodes, wherein the respective said two different classes of electrodes include phase identifiers referring to reference phases differing by 180° from each other.

11. The method according to claim 5, wherein at least one of said at least one subunit electrode of said subunit electrode layout of said type information of at least one of said at least one layout subunit type is assigned to a class of electrodes being associated with a type of voltage pattern being a periodic voltage pattern having a radio frequency.

12. The method according to claim 1, wherein said subunit electrode layout of said type information of at least one of said at least one layout subunit type is a multiple electrode layout of at least two or at least three subunit electrodes.

13. The method according to claim 1, wherein by defining a global wiring layout for wiring said electrodes of said layout of electrodes, said global wiring layout being in reference to said global reference system.

14. The method according to claim 13, wherein said type information of at least one of said at least one layout subunit type includes a subunit wiring layout for wiring said at least one subunit electrode of said subunit electrode layout of the respective said type information, said subunit wiring layout being in reference to said subunit reference system.

15. A method for manufacturing an arrangement of electrodes for an ion guide for transporting ions along an ion path comprising said electrodes arranged in a layout of electrodes along said ion path for transporting said ions along said ion path, wherein said layout of electrodes is generated with the method according to claim 1 and wherein said arrangement of electrodes is manufactured based on said layout of electrodes.

16. A method for generating an ion guide for transporting ions along an ion path comprising electrodes arranged in a layout of electrodes along said ion path for transporting said ions along said ion path, wherein said layout of electrodes for said ion guide for transporting said ions along said ion path is generated with said method according to claim 1.

17. A method for manufacturing an ion guide for transporting ions along an ion path by generating said ion guide with the method according to claim 16 and by subsequently manufacturing said ion guide.

18. A computer program product comprising instructions which, when the program is executed by a computer, cause the computer to carry out the method according to claim 1.

* * * * *